US011665527B2

(12) United States Patent
Lopez et al.

(10) Patent No.: US 11,665,527 B2
(45) Date of Patent: *May 30, 2023

(54) SYSTEMS AND METHODS FOR CONFIGURING ROUTERS AND FOR FACILITATING COMMUNICATION BETWEEN ROUTERS

(71) Applicant: AT&T Intellectual Property I, L.P., Atlanta, GA (US)

(72) Inventors: Arturo Barraza Lopez, Naucalpan de Juarez (MX); Eduardo Bolivar Gaytan, Atizapan de Zaragoza (MX)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/523,632

(22) Filed: Nov. 10, 2021

(65) Prior Publication Data

US 2022/0070653 A1    Mar. 3, 2022

Related U.S. Application Data

(63) Continuation of application No. 16/882,088, filed on May 22, 2020, now Pat. No. 11,202,195.
(Continued)

(51) Int. Cl.
*H04L 12/46*      (2006.01)
*H04L 41/0806*    (2022.01)
(Continued)

(52) U.S. Cl.
CPC ........... *H04W 8/18* (2013.01); *H04L 12/4633* (2013.01); *H04L 41/0806* (2013.01);
(Continued)

(58) Field of Classification Search
CPC . H04L 12/46–4695; H04L 41/02–0293; H04L 41/08–0896; H04L 41/32–40;
(Continued)

(56) References Cited

U.S. PATENT DOCUMENTS 7,197,550 B2    3/2007  Cheline et al.
7,313,819 B2   12/2007  Burnett et al.
(Continued)

FOREIGN PATENT DOCUMENTS

WO    WO-0106734 A2 *  1/2001  ............. H04W 8/06

OTHER PUBLICATIONS

"AT&T VPN Gateway U115", Jan. 1, 2019, 6 pgs.
(Continued)

*Primary Examiner* — Timothy J Weidner
(74) *Attorney, Agent, or Firm* — Guntin & Gust, PLC; Matthew Tropper

(57) ABSTRACT

Aspects of the subject disclosure may include, for example, storing, in a database, subscriber information associated with a plurality of subscribers of a wireless carrier, the subscriber information comprising first subscriber information associated with a first subscriber of the wireless carrier, the first subscriber information comprising first configuration data for a first router of the first subscriber, the first router being located at a first physical location; wirelessly receiving from a second router of the first subscriber, via a wireless service of the wireless carrier, a first registration request made by the second router, the second router being located at a second physical location; responsive to receiving the first registration request, generating first provisioning information, the first provisioning information being based at least in part upon the first configuration data for the first router that is stored in the database; and wirelessly sending to the second router, via the wireless service of the wireless
(Continued)

carrier, the first provisioning information, the first provisioning information enabling the first router and the second router to communicate with one another via the wireless service through a first tunnel mechanism. Other embodiments are disclosed.

20 Claims, 22 Drawing Sheets

Related U.S. Application Data

(60) Provisional application No. 62/989,405, filed on Mar. 13, 2020.

(51) Int. Cl.
| | | |
|---|---|---|
| *H04L 47/70* | (2022.01) |
| *H04W 8/18* | (2009.01) |
| *H04W 12/69* | (2021.01) |
| *H04W 60/00* | (2009.01) |
| *H04W 76/12* | (2018.01) |
| *H04W 84/04* | (2009.01) |
| *H04W 84/12* | (2009.01) |
| *H04W 88/08* | (2009.01) |
| *H04W 88/18* | (2009.01) |
| *H04W 92/02* | (2009.01) |
| *H04W 92/12* | (2009.01) |
| *H04W 92/20* | (2009.01) |

(52) U.S. Cl.
CPC .......... *H04L 47/825* (2013.01); *H04W 12/69* (2021.01); *H04W 60/005* (2013.01); *H04W 76/12* (2018.02); *H04W 84/042* (2013.01); *H04W 84/12* (2013.01); *H04W 88/08* (2013.01); *H04W 88/18* (2013.01); *H04W 92/02* (2013.01); *H04W 92/12* (2013.01); *H04W 92/20* (2013.01)

(58) Field of Classification Search
CPC ....... H04L 45/02–10; H04L 47/82–829; H04L 63/02–029; H04W 4/50–60; H04W 8/005–30; H04W 12/009–80; H04W 48/02–20; H04W 60/005–06; H04W 76/10–50; H04W 80/02–12; H04W 84/005–22; H04W 88/005–188; H04W 92/02–24

See application file for complete search history.

(56) References Cited

U.S. PATENT DOCUMENTS

| | | | |
|---|---|---|---|
| 7,478,167 B2 | 1/2009 | Ould-brahim et al. |
| 7,848,335 B1 | 12/2010 | Kang et al. |
| 7,945,696 B2 | 5/2011 | Vasseur et al. |
| 8,136,151 B2 | 3/2012 | Smith et al. |
| 8,179,905 B1 | 5/2012 | Napierala et al. |
| 8,320,279 B2 | 11/2012 | Sarkar et al. |
| 8,625,465 B1 | 1/2014 | Aggarwal et al. |
| 8,774,047 B2 | 7/2014 | Kulmala et al. |
| 8,908,698 B2 | 12/2014 | Aguayo et al. |
| 9,491,686 B2 | 11/2016 | Bosch et al. |
| 10,142,173 B2 | 11/2018 | Elisha |
| 11,202,195 B2* | 12/2021 | Lopez .................... H04W 8/18 |
| 2006/0056314 A1 | 3/2006 | Daures |
| 2006/0089121 A1 | 4/2006 | Elgebaly et al. |
| 2006/0133265 A1 | 6/2006 | Lee |
| 2006/0182122 A1 | 8/2006 | Davie et al. |
| 2009/0113521 A1 | 4/2009 | Engdahl et al. |
| 2012/0167196 A1 | 6/2012 | Colar et al. |
| 2014/0219135 A1 | 8/2014 | Li et al. |
| 2016/0315912 A1 | 10/2016 | Mayya et al. |
| 2017/0099159 A1 | 4/2017 | Abraham |
| 2019/0109729 A1 | 4/2019 | De Luca |
| 2019/0335324 A1 | 10/2019 | Ringland et al. |
| 2021/0288838 A1 | 9/2021 | Lopez et al. |
| 2022/0210756 A1* | 6/2022 | Kumar .................... H04W 8/18 |

OTHER PUBLICATIONS

"Generic Routing Encapsulation", Wikipedia, Jan. 30, 2020, Jan. 30, 2020, 6 pgs.

"Generic Routing Encapsulation", Wikipedia, Apr. 24, 2021, Apr. 24, 2021, 6 pgs.

Hori, et al., "Provider provisioned internet VPN for personal communication environment", The 8th Asia-Pacific Network Operations and Management Symposium. 2005.

Polezhaev, et al., "Implementation of dynamically autoconfigured multiservice multipoint VPN", 2015 9th International Conference on Application of Information and Communication Technologies (AICT). IEEE, 2015.

* cited by examiner

2250

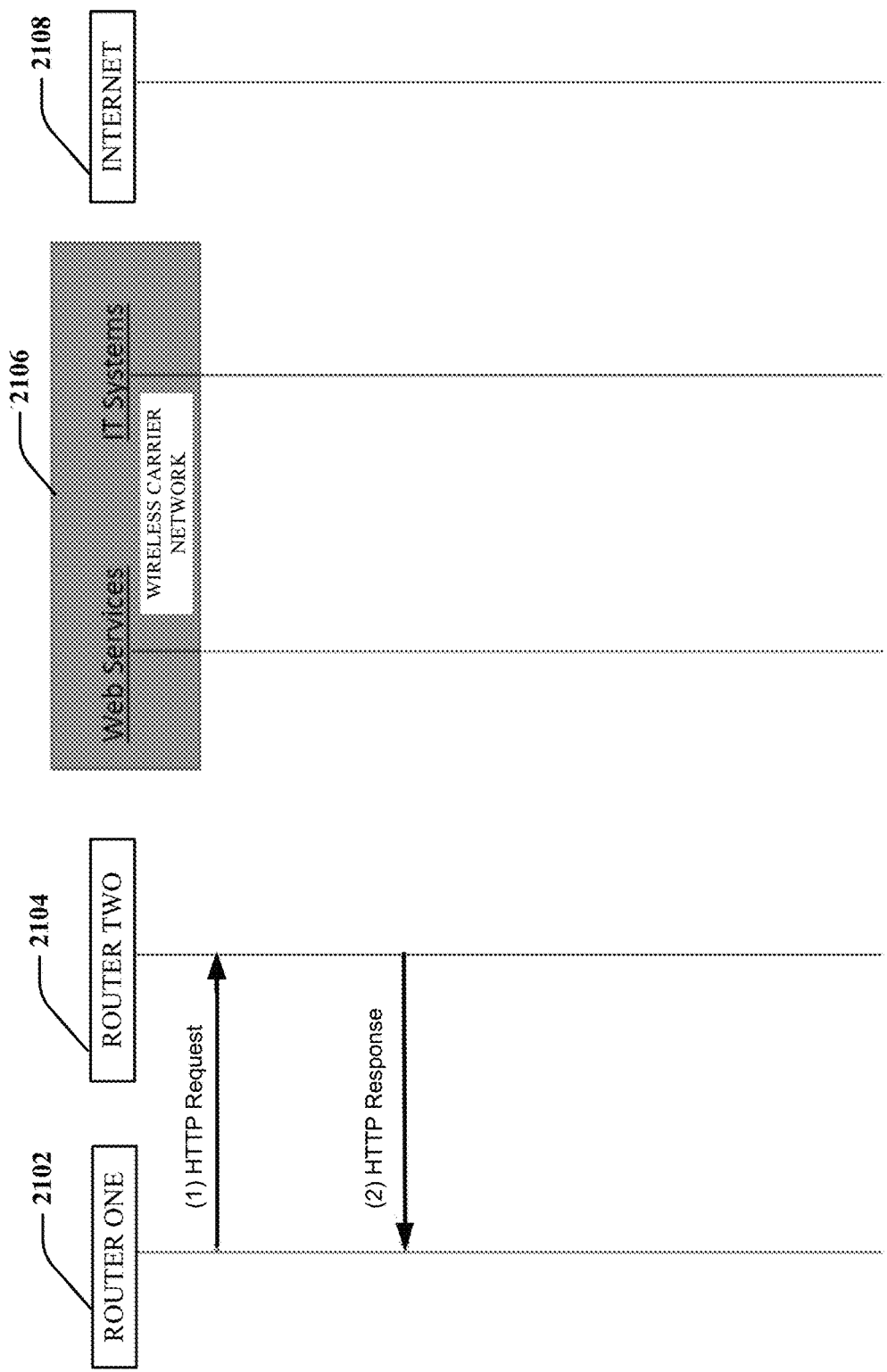

2452

Wirelessly transmitting by a first router having a processing system including a processor, exclusively via a wireless service of a wireless carrier, a registration request to a network element of the wireless carrier that provides the wireless service, the registration request comprising a first International Mobile Equipment Identity (IMEI) of the first router, a first Mobile Station International Subscriber Directory Number (MSISDN) of the first router, or any combination thereof, the first router operating at a first physical location of a subscriber to the wireless service

2454

Wirelessly receiving by the first router, exclusively via the wireless service of the wireless carrier, provisioning information, the provisioning information being provided by a server of the wireless carrier responsive to the network element of the wireless carrier having wirelessly received the registration request, the provisioning information comprising configuration data from a database of the wireless carrier, the configuration data being obtained from the database based upon the first router being associated in the database with a second router of the subscriber to the wireless service, the second router operating at a second physical location that is different from the first physical location, the configuration data identifying a network location of the second router, the provisioning information enabling the first router and the second router to communicate with one another via the wireless service through a tunnel mechanism that extends between the first router and the second router exclusively over the wireless service

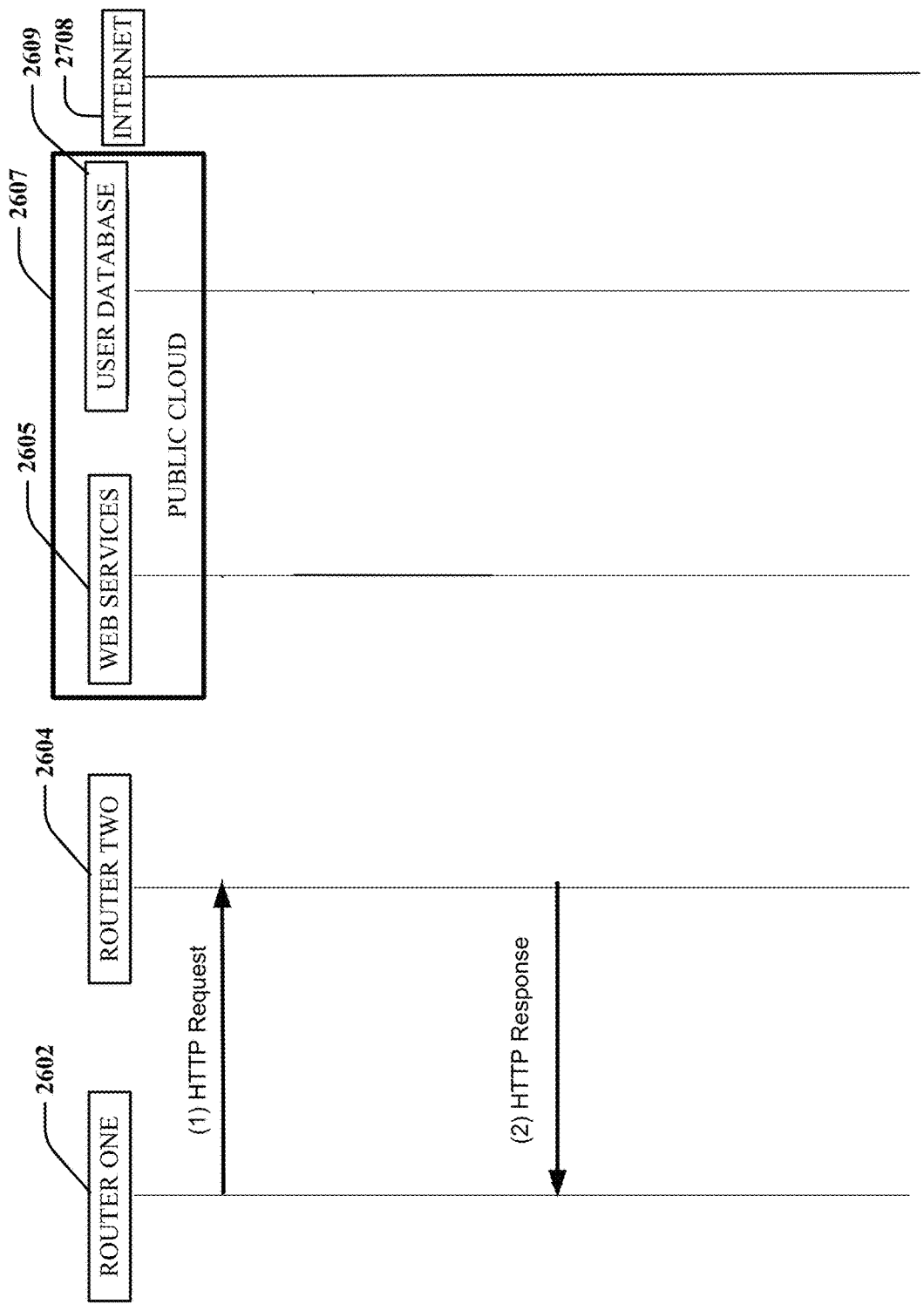

300

SYSTEMS AND METHODS FOR CONFIGURING ROUTERS AND FOR FACILITATING COMMUNICATION BETWEEN ROUTERS

CROSS REFERENCE TO RELATED APPLICATION(S)

The present application is a continuation of U.S. patent application Ser. No. 16/882,088, filed May 22, 2020, which claims the benefit of priority to U.S. Provisional Application No. 62/989,405, filed Mar. 13, 2020. All sections of the aforementioned application(s) and/or patent(s) are incorporated herein by reference in their entirety.

FIELD OF THE DISCLOSURE

The subject disclosure relates to systems and methods for configuring routers and for facilitating communication between routers.

BACKGROUND

Current mechanisms for facilitating electronic communication between two or more business locations (such as business locations of a single owner) are typically expensive and typically need special information technology ("IT") knowledge to be set up.

For example, certain conventional mechanisms perform virtual private network ("VPN") functions between several devices, but such mechanisms typically need to have someone to set the appropriate parameters such as network, VPN tunnel, and others, and every time equipment (e.g., a new router) is added, such mechanisms typically require having a technician perform a configuration so that the equipment (e.g., the new router) can see (and be seen by) all of the other equipment (e.g., one or more existing routers).

Other conventional mechanisms work over the Internet on the cloud, where such mechanisms typically manage the routers and the connectivity (wherein various configuration information and the like travels via the Internet).

BRIEF DESCRIPTION OF THE DRAWINGS

Reference will now be made to the accompanying drawings, which are not necessarily drawn to scale, and wherein:

FIG. 2G is a diagram illustrating an example, non-limiting embodiment (Intranet Call Flow (HTTP)) that can function (fully or partially) within the communication network of FIG. 1 in accordance with various aspects described herein.

FIG. 2I depicts an illustrative embodiment of a method in accordance with various aspects described herein.

FIG. 2J depicts an illustrative embodiment of a method in accordance with various aspects described herein.

FIG. 2O is a diagram illustrating an example, non-limiting embodiment (Mac Addresses Update) that can function (fully or partially) within the communication network of FIG. 1 in accordance with various aspects described herein.

FIG. 2Q is a diagram illustrating an example, non-limiting embodiment (Intranet Call Flow (HTTP)) that can function (fully or partially) within the communication network of FIG. 1 in accordance with various aspects described herein.

DETAILED DESCRIPTION

Figure 1:
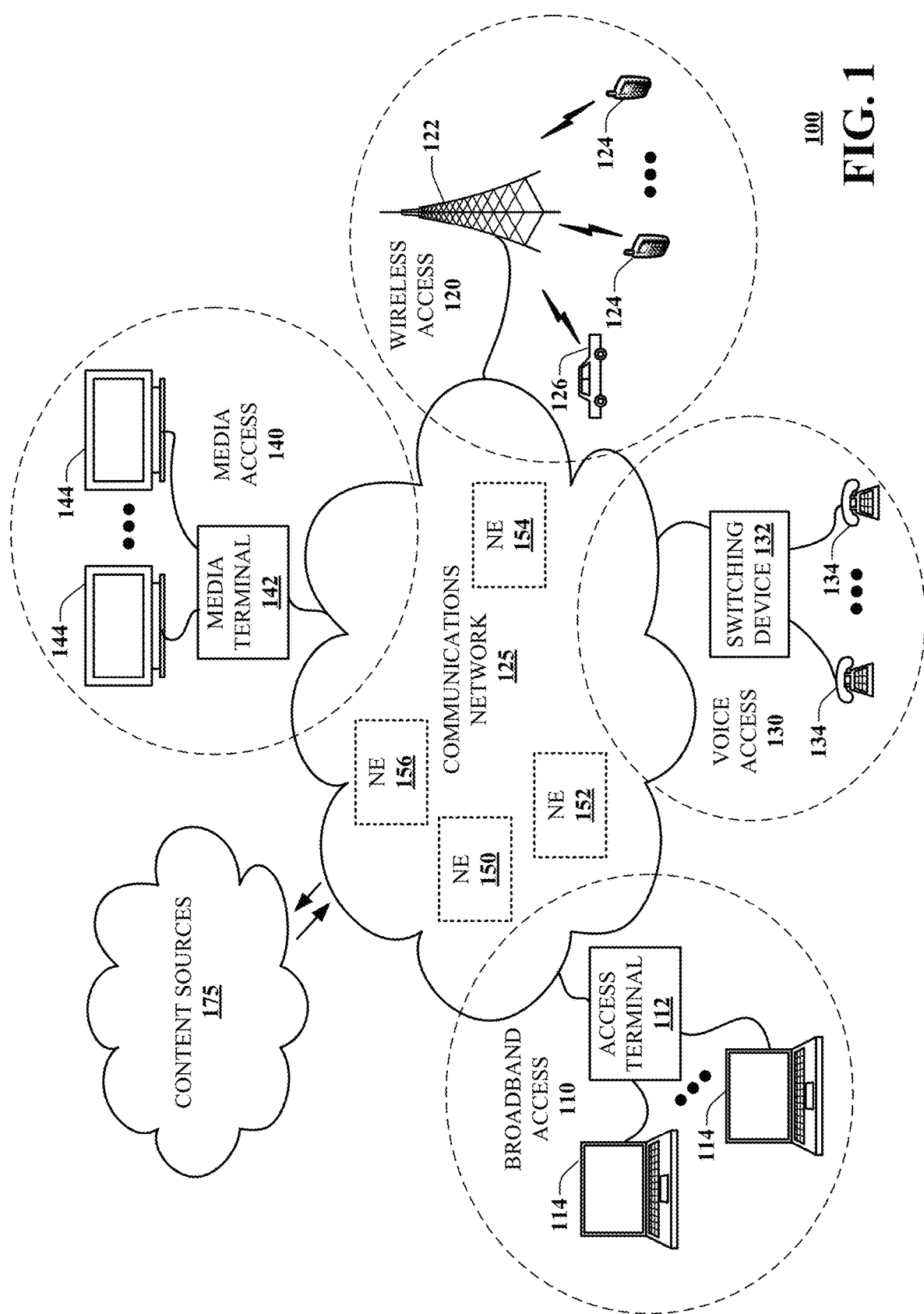
FIG. 1 is a block diagram illustrating an example, non-limiting embodiment of a communication network in accordance with various aspects described herein.

The subject disclosure describes, among other things, illustrative embodiments for a smart router that performs virtual private network (VPN) between two or more locations. In one example, the smart router operates in an automatic manner (e.g., without intervention of any technician). In another example, the interaction of two or more smart routers builds a full mesh. In another example, the equipment (e.g., router) just has to be provisioned as being associated with a given subscriber account (e.g., subscriber account of a wireless carrier) and the provisioned router will then be automatically linked to other routers of the given subscriber. Other embodiments are described in the subject disclosure.

One or more aspects of the subject disclosure include a wireless smart router that performs automatic tunnels between all other routers that are provisioned as being associated with the same account (e.g., the same wireless carrier account) of a given client (e.g. a given subscriber). In one example, the smart router connects to servers of the wireless carrier. The servers of the wireless carrier can access accounts of the various subscribers and determine how many and which other routers the given subscriber has associated with its account. Based on the determination of how many and which other routers, the servers can automatically create (and/or automatically facilitate creation of) tunnels (e.g., generic routing encapsulation (GRE) tunnels) between all the related routers. In one example, if the subscriber wants to add a new router at a new location, the subscriber just obtains (e.g., buys or leases) the new smart router and asks for the new smart router to be provisioned into the account of the subscriber (wherein the new smart router can then perform the tunnels automatically).

One or more aspects of the subject disclosure include mechanisms via which the tunnels are created on the same Access Point Name (APN) and the information that the smart routers share between themselves never (in various examples) leaves the network of the wireless carrier (e.g., never leaves the core network of the wireless carrier).

One or more aspects of the subject disclosure include mechanisms for dynamic Internet Protocol (IP) addressing inside the wireless carrier network. In one example, all related smart routers can be updated (e.g., with any new IP address information) when a new smart router is provisioned (or otherwise associated with a given subscriber account). In another example, all related smart routers can be updated (e.g., with any new IP address information) when IP address information for one or more smart routers changes.

One or more aspects of the subject disclosure include an application (APP) that can be provided to change the WiFi password (of a smart router). In one example, the APP can permit a user to review how many (and/or which) routers are associated with a given subscriber account and/or check if such related routers are on or off. In another example, the APP can have capability of management such that a user can see which smart routers are connected to any of the other smart routers. In another example, the APP can have capability of management such that a user can see which other devices (e.g., computers, printers, smartphones) are connected to any of the smart routers.

Referring now to FIG. 1, a block diagram is shown illustrating an example, non-limiting embodiment of a communication network 100 in accordance with various aspects described herein. For example, communication network 100 can facilitate in whole or in part provisioning/configuring of one or more routers (e.g., initially and/or periodically) and enabling secure communications between two or more routers (e.g., routers that have previously been provisioned/configured). In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communications network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
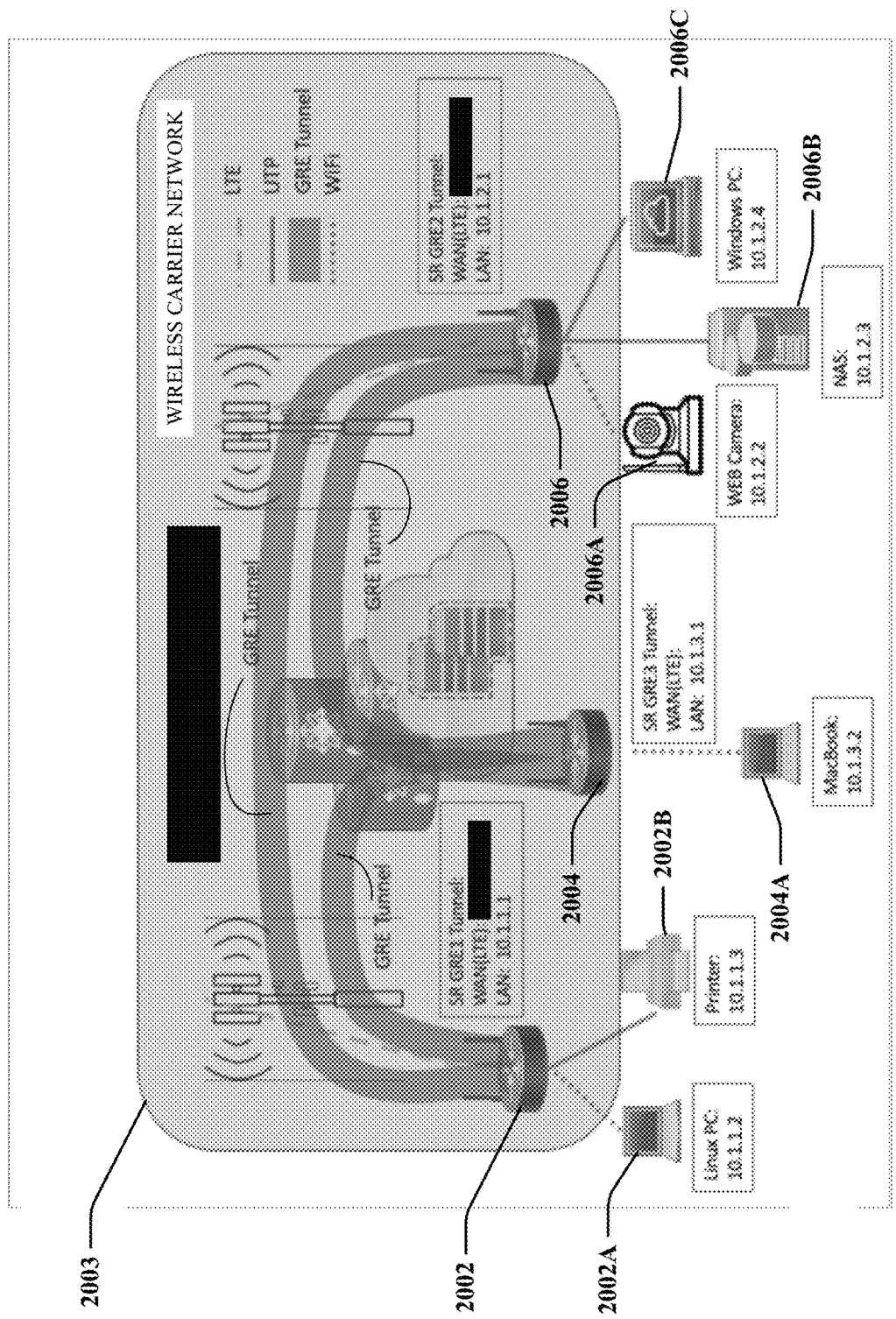
FIG. 2A is a block diagram illustrating an example, non-limiting embodiment of an architecture that can function (fully or partially) within the communication network of FIG. 1 in accordance with various aspects described herein.

Referring now to FIG. 2A, this is a block diagram illustrating an example, non-limiting embodiment of an architecture 2000 (such as can provide one or more virtual private networks (VPNs)) that can function (fully or partially) within the communication network of FIG. 1 in accordance with various aspects described herein. As seen in this FIG. 2A, a smart router 2002 can be in a certain location (for example, a location at which a business entity conducts business). Various end devices (e.g., computers, printers, smartphones) are in operative bi-directional communication with the smart router 2002. In this example, LINUX PC 2002A is in operative bi-directional communication with smart router 2002 via WiFi. In addition, in this example, Printer 2002B is in operative bi-directional communication with smart router 2002 via UTP. Further, smart router 2002 is in operative wireless bi-directional communication with one or more servers of wireless carrier network 2003 (in this example, the operative wireless bi-directional communication between the smart router 2002 and the wireless carrier network 2003 is via an LTE protocol). In other examples, the operative wireless bi-directional communication between the smart router 2002 and the wireless carrier network 2003 can be via a $5^{th}$ generation (5G) protocol and/or $6^{th}$ generation (6G) protocol.

Still referring to FIG. 2A, another smart router 2004 can be in a certain location (for example, a location (different from the location of smart router 2002) at which the business entity conducts business). Various end devices (e.g., computers, printers, smartphones) are in operative bi-directional communication with the smart router 2004. In this example, MACBOOK 2004A is in operative bi-directional communication with smart router 2004 via WiFi. Further, smart router 2004 is in operative wireless bi-directional communication with one or more servers of wireless carrier network 2003 (in this example, the operative wireless bi-directional communication between the smart router 2004 and the wireless carrier network 2003 is via an LTE protocol). In other examples, the operative wireless bi-directional communication between the smart router 2004 and the wireless carrier network 2003 can be via a $5^{th}$ generation (5G) protocol and/or $6^{th}$ generation (6G) protocol.

Still referring to FIG. 2A, yet another smart router 2006 can be in a certain location (for example, a location (different from the locations of smart routers 2002 and 2004) at which the business entity conducts business). Various end devices (e.g., computers, printers, smartphones) are in operative bi-directional communication with the smart router 2006. In this example, Web Camera 2006A is in operative bi-directional communication with smart router 2006 via WiFi. Further, NAS 2006B is in operative bi-directional communication with smart router 2006 via UTP. Further, WINDOWS PC 2006C is in operative bi-directional communication with smart router 2006 via UTP. Further, smart router 2006 is in operative wireless bi-directional communication with one or more servers of wireless carrier network 2003 (in this example, the operative wireless bi-directional communication between the smart router 2006 and the wireless carrier network 2003 is via an LTE protocol). In other examples, the operative wireless bi-directional communication between the smart router 2006 and the wireless carrier network 2003 can be via a $5^{th}$ generation (5G) protocol and/or $6^{th}$ generation (6G) protocol.

Still referring to FIG. 2A, all of smart routers 2002, 2004, 2006 can operate in wireless carrier network 2003 in the context of the same single Access Point Name (APN). For example, all of smart routers 2002, 2004, 2006 can operate in wireless carrier network 2003 in the context of "ott.iot-.carrier.mx".

Still referring to FIG. 2A, smart router 2002 can be in operative bi-directional communication (e.g., via wireless carrier network 2003) with smart router 2004 via one GRE Tunnel (which can be formed and/or enabled using various mechanisms described herein). Further, smart router 2002 can be in operative bi-directional communication (e.g., via wireless carrier network 2003) with smart router 2006 via another GRE Tunnel (which can be formed and/or enabled using various mechanisms described herein). Further still, smart router 2004 can be in operative bi-directional communication (e.g., via wireless carrier network 2003) with smart router 2006 via yet another GRE Tunnel (which can be formed and/or enabled using various mechanisms described herein).

Figure 2B:
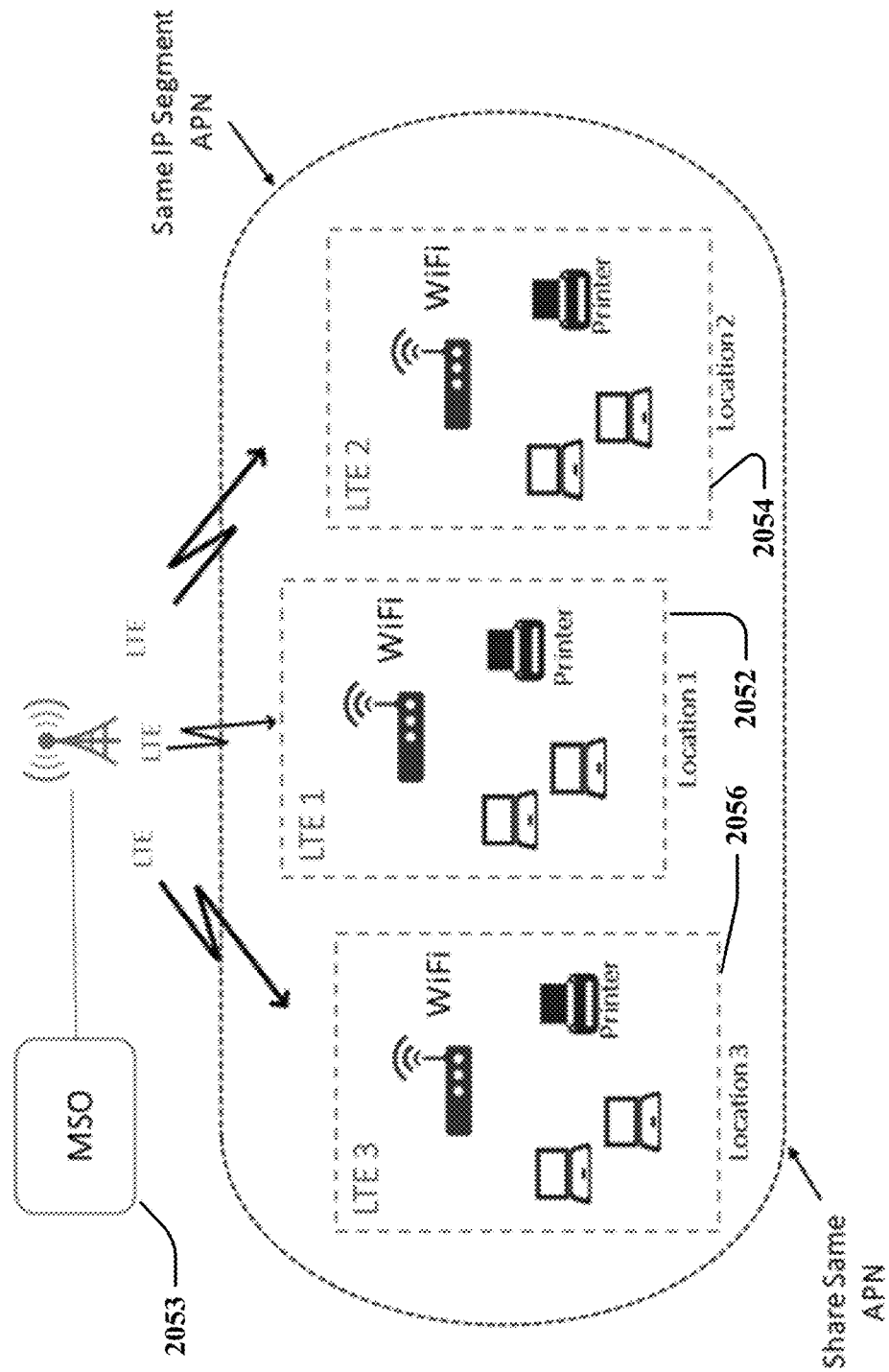
FIG. 2B is a block diagram illustrating an example, non-limiting embodiment of a system that can function (fully or partially) within the communication network of FIG. 1 in accordance with various aspects described herein.

Referring now to FIG. 2B, this is a block diagram illustrating an example, non-limiting embodiment of a system 2050 that can function (fully or partially) within the communication network of FIG. 1 in accordance with various aspects described herein. As seen in this FIG. 2B, a smart router can be in Location 1 (see call out number 2052). Location 1 can be, for example, a location at which a business entity conducts business. Various end devices (e.g., computers, printers, smartphones) are in operative bi-directional communication (e.g., via WiFi) with the smart router at Location 1. Further, the smart router at Location 1 is in operative bi-directional communication with MSO 2053 (in this example, the operative bi-directional communication with Mobile Switching Office (MSO) 2053 utilizes an LTE protocol). In other examples, the operative bi-directional communication with MSO 2053 can utilize a $5^{th}$ generation (5G) protocol and/or $6^{th}$ generation (6G) protocol.

Still referring to FIG. 2B, another smart router can be in Location 2 (see call out number 2054). Location 2 can be, for example, a location (different from Location 1) at which the business entity conducts business. Various end devices (e.g., computers, printers, smartphones) are in operative bi-directional communication (e.g., via WiFi) with the smart router at Location 2. Further, the smart router at Location 2 is in operative bi-directional communication with MSO 2053 (in this example, the operative bi-directional communication with MSO 2053 utilizes an LTE protocol). In other examples, the operative bi-directional communication with MSO can utilize a $5^{th}$ generation (5G) protocol and/or $6^{th}$ generation (6G) protocol.

Still referring to FIG. 2B, yet another smart router can be in Location 3 (see call out number 2056). Location 3 can be, for example, a location (different from Location 1 and different from Location 2) at which the business entity conducts business. Various end devices (e.g., computers, printers, smartphones) are in operative bi-directional communication (e.g., via WiFi) with the smart router at Location 3. Further, the smart router at Location 3 is in operative bi-directional communication with MSO 2053 (in this example, the operative bi-directional communication with MSO 2053 utilizes an LTE protocol). In other examples, the operative bi-directional communication with MSO can utilize a $5^{th}$ generation (5G) protocol and/or $6^{th}$ generation (6G) protocol. Of course, while three locations are discussed in this example, any desired number of locations and/or any desired number of smart routers can be utilized.

Still referring to FIG. 2B, the smart routers can perform VPN between two or more locations (e.g., in an automatic manner without intervention of any technician). In some examples, various implementations facilitate building a full mesh, wherein the equipment just needs to be provisioned on a carrier account and the system of the carrier will automatically link to all devices of a given customer or subscriber (such as a given company or a given organization).

Still referring to FIG. 2B, as seen in this example, all of the Locations 1, 2, and 3 share the same APN (Access Point Name).

Figure 2C:
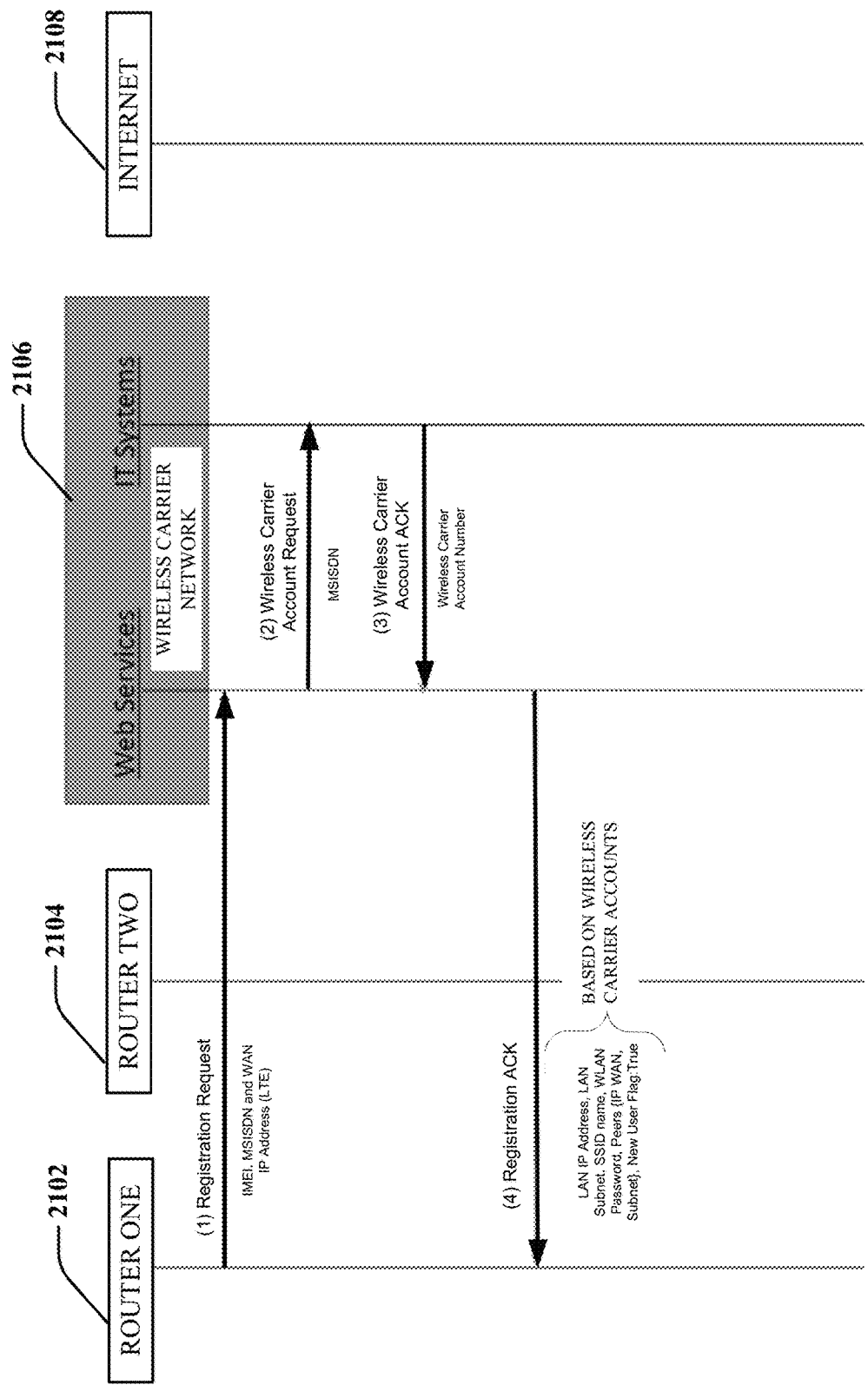
FIG. 2C is a diagram illustrating an example, non-limiting embodiment (Registration Flow-New Router) that can function (fully or partially) within the communication network of FIG. 1 in accordance with various aspects described herein.

Referring now to FIG. 2C, this is a diagram 2100 illustrating an example, non-limiting embodiment ((Registration Flow-New Router) that can function (fully or partially) within the communication network of FIG. 1 in accordance with various aspects described herein. As seen in this FIG. 2C, Router One 2102 is in operative bi-directional communication with Wireless Carrier Network 2106. In this example, Wireless Carrier Network 2106 includes Web Services and IT Systems. Further, while this example registration process is described here for Router One 2102, such a process can also apply to Router Two 2104. In addition, while two routers are shown in this example, any desired number of routers may be supported. In one example, Router One 2102 can be physically located in a first location that is used by and/or operated by a business entity and Router Two 2104 can be physically located in a second location that is used by and/or operated by the business entity. The first location can be physically remote from the second location. For instance, the first and second locations can be in different buildings. Further, the Internet 2108 can be used for certain communications as described, for example, with reference to FIG. 2F.

Still referring to FIG. 2C, Router One 2102 can transmit a Registration Request (see arrow 1 of this FIG.) to the Wireless Carrier Network 2106. In various examples, the Registration Request can comprise an IMEI (International Mobile Equipment Identity) of Router One 2102, an MSISDN (Mobile Station International Subscriber Directory Number) of Router One 2102, a Wide Area Network (WAN) IP Address (e.g., LTE) of Router One 2102, or any combination thereof. The Registration Request from Router One 2102 can be transmitted wirelessly to one or more servers of Wireless Carrier Network 2106. The wireless transmission of the Registration Request from Router One 2102 to the Wireless Carrier Network 2106 can be carried out by Router One 2102 using only the wireless functionality provided by Wireless Carrier Network 2106. The wireless transmission of the Registration Request from Router One 2102 to the Wireless Carrier Network 2106 can be carried out by Router One 2102 using only elements operated by and/or controlled by Wireless Carrier Network 2106 (e.g., without sending any information over the Internet).

Still referring to FIG. 2C, the Web Services of the Wireless Carrier Network 2106 can transmit (responsive to receipt of the Registration Request) a Wireless Carrier Account Request (see arrow 2 of this FIG.) to the IT Systems of the Wireless Carrier Network 2106. In one example, the Wireless Carrier Account Request can comprise the MSISDN of Router One 2102. Further, responsive to the Wireless Carrier Account Request, the IT Systems can transmit a Wireless Carrier Account Acknowledgement (see arrow 3 of this FIG.). In one example, the Wireless Carrier Account Acknowledgement can comprise a Wireless Carrier Account Number associated with a subscriber to wireless services of the wireless carrier that operates the Wireless Carrier Network 2106. The subscriber can be, for example, a business entity that utilizes Router One 2102 and Router Two 2104.

Still referring to FIG. 2C, the Web Services of the Wireless Carrier Network 2106 can transmit back to Router One 2102 (responsive to receipt of the Wireless Carrier Account Number) a Registration Acknowledgement (see arrow 4 of this FIG.). The Registration Acknowledgement can comprise information that is based on one or more wireless carrier accounts. In one example, the Registration Acknowledgement can comprise information that is based on the wireless carrier account of the subscriber (e.g., the business entity that utilizes Router One 2102 and Router Two 2104). In various examples, the Registration Acknowledgement can comprise for Router One 2102 a LAN IP Address, a LAN Subnet, a Service Set Identifier (SSID) name, a WLAN password, various Peers information (e.g., IP WAN, Subnet), a New User (e.g., new router) Flag, or any combination thereof. The Registration Acknowledgement transmitted to Router One 2102 can be transmitted wirelessly by one or more servers of Wireless Carrier Network 2106. The wireless transmission of the Registration Acknowledgement to Router One 2102 from the Wireless Carrier Network 2106 can be carried out using only the wireless functionality provided by Wireless Carrier Network 2106. The wireless transmission of the Registration Acknowledgement to Router One 2102 from the Wireless Carrier Network 2106 can be carried out using only elements operated by and/or controlled by Wireless Carrier Network 2106 (e.g., without sending any information over the Internet).

Figure 2D:
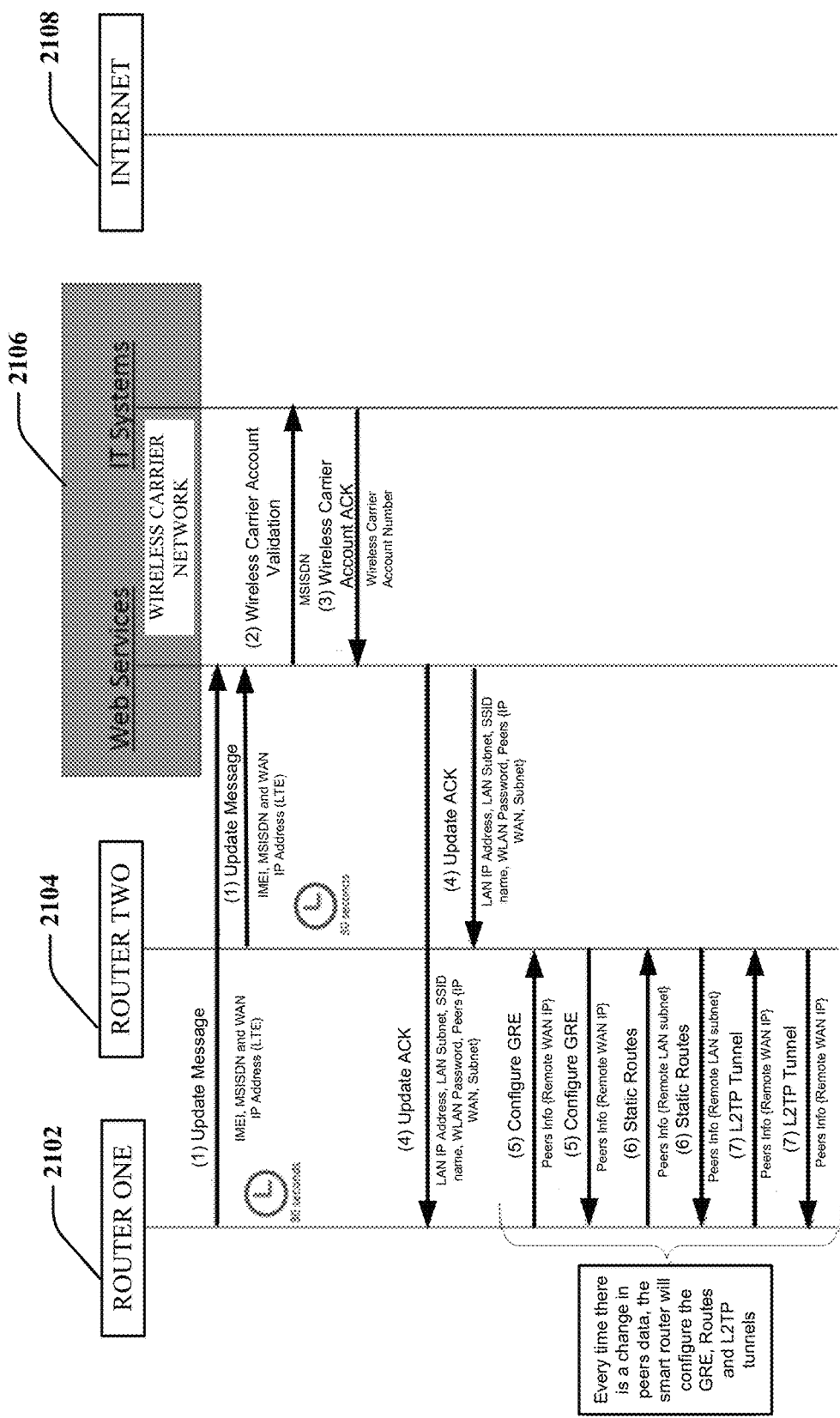
FIG. 2D is a diagram illustrating an example, non-limiting embodiment (Encapsulation/Tunneling) that can function (fully or partially) within the communication network of FIG. 1 in accordance with various aspects described herein.

Referring now to FIG. 2D this is a diagram 2150 illustrating an example, non-limiting embodiment (Encapsulation/Tunneling) that can function (fully or partially) within the communication network of FIG. 1 in accordance with various aspects described herein. In this FIG. 2D, each of the Router One 2102, Router Two 2104, Wireless Carrier Network 2106, and Internet 2108 can correspond to the respective elements of FIG. 2C. For the purposes of this example, it is assumed that Router One 2102 and Router Two 2104 have already been registered (e.g., using the process shown in FIG. 2C).

Still referring to FIG. 2D, both Router One 2102 and Router Two 2104 are in operative bi-directional communication with Wireless Carrier Network 2106. Router One 2102 can transmit an Update Message (see the upper arrow 1 of this FIG.) to the Wireless Carrier Network 2106. The Update Message from Router One 2102 can be transmitted wirelessly to one or more servers of Wireless Carrier Network 2106 as described in a manner similar to that described in connection with FIG. 2C. In various examples, this Update Message can comprise an IMEI of Router One 2102, an MSISDN of Router One 2102, a Wide Area Network (WAN) IP address (e.g., LTE) of Router One 2102, or any combination thereof. In the example shown, this Update Message can be transmitted every 30 seconds (of course, such an Update Message can be transmitted at any desired frequency (e.g., every 10 seconds, every 60 seconds, every 5 minutes) or at any non-periodic time interval).

Still referring to FIG. 2D, Router Two 2104 can transmit an Update Message (see the lower arrow 1 of this FIG.) to the Wireless Carrier Network 2106. The Update Message from Router Two 2104 can be transmitted wirelessly to one or more servers of Wireless Carrier Network 2106 as described in a manner similar to that described in connection with FIG. 2C. In various examples, this Update Message can comprise an IMEI of Router Two 2104, an MSISDN of Router Two 2104, a Wide Area Network (WAN) IP address (e.g., LTE) of Router Two 2104, or any combination thereof. In the example shown, this Update Message can be transmitted every 30 seconds (of course, such an Update Message can be transmitted at any desired frequency (e.g., every 10 seconds, every 60 seconds, every 5 minutes) or at any non-periodic time interval). The timing of each respective Update Message from each router can be synchronized or non-synchronized.

Still referring to FIG. 2D, the Web Services of the Wireless Carrier Network 2106 can transmit (responsive to receipt of the Update Messages) a Wireless Carrier Account Validation (see arrow 2 of this FIG.) to the IT Systems of the Wireless Carrier Network 2106. While a single arrow 2 is shown in this FIG., it is to be understood that a distinct Wireless Carrier Account Validation can be sent for each Update Message. In one example, one Wireless Carrier Account Validation (that corresponds to the Update Message from Router One 2102) can comprise the MSISDN of Router One 2102 and another (different) Wireless Carrier Account Validation (that corresponds to the Update Message from Router Two 2104) can comprise the MSISDN of Router Two 2104. Further, responsive to each Wireless Carrier Account Validation, the IT Systems can transmit a Wireless Carrier Account Acknowledgement (see arrow 3 of this FIG.). While a single arrow 3 is shown in this FIG. it is to be understood that a distinct Wireless Carrier Account Acknowledgement can be sent for each Update Message. In one example, one Wireless Carrier Account Acknowledgement (that corresponds to the Update Message from Router One 2102) can comprise the Wireless Carrier Account Number associated with the subscriber to the wireless services of the wireless carrier that operates the Wireless Carrier Network 2106 and another Wireless Carrier Account Acknowledgement (that corresponds to the Update Message from Router Two 2104) can also comprise the Wireless Carrier Account Number associated with the subscriber to the wireless services of the wireless carrier that operates the Wireless Carrier Network 2106. The subscriber can be, for example, the business entity that utilizes Router One 2102 and Router Two 2104.

Still referring to FIG. 2D, the Web Services of the Wireless Carrier Network 2106 can transmit back to Router One 2102 (responsive to receipt of the respective Wireless Carrier Account Acknowledgement) an Update Acknowledgement (see the upper arrow 4 of this FIG.). The Update Acknowledgement can comprise information that is based on the wireless carrier account of the subscriber (e.g., the business entity that utilizes Router One 2102 and Router Two 2104). In various examples, this Update Acknowledgement can comprise for Router One 2102 a LAN IP Address, a LAN Subnet, a Service Set Identifier (SSID) name, a WLAN password, various Peers information (e.g., IP WAN, Subnet), or any combination thereof. The Update Acknowledgement to Router One 2102 can be transmitted wirelessly from one or more servers of Wireless Carrier Network 2106 as described in a manner similar to that described in connection with FIG. 2C.

Still referring to FIG. 2D, the Web Services of the Wireless Carrier Network 2106 can transmit back to Router Two 2104 (responsive to receipt of the respective Wireless Carrier Account Acknowledgement) an Update Acknowledgement (see the lower arrow 4 of this FIG.). The Update Acknowledgement can comprise information that is based on the wireless carrier account of the subscriber (e.g., the business entity that utilizes Router One 2102 and Router Two 2104). In various examples, this Update Acknowledgement can comprise for Router Two 2104 a LAN IP Address, a LAN Subnet, a Service Set Identifier (SSID) name, a WLAN password, various Peers information (e.g., IP WAN, Subnet), or any combination thereof. The Update Acknowledgement to Router Two 2104 can be transmitted wirelessly from one or more servers of Wireless Carrier Network 2106 in a manner similar to that described in connection with FIG. 2C.

Still referring to FIG. 2D, Router One 2102 can transmit to Router Two 2104 information to Configure GRE (see the upper arrow 5 in this FIG). This Configure GRE information can compromise respective Peers information (e.g., Remote WAN IP). The Configure GRE information can be transmitted wirelessly from Router One 2102 to Router Two 2104 in a manner similar to that described in connection with FIG. 2C (e.g., using exclusively the wireless service of the wireless network carrier, without the information going on the Internet).

Still referring to FIG. 2D, Router Two 2104 can transmit to Router One 2102 information to Configure GRE (see the lower arrow 5 in this FIG). This information to Configure GRE can be, for example, in response to the Configure GRE from Router One 2102. This information to Configure GRE from Router Two 2104 can compromise respective Peers information (e.g., Remote WAN IP). This information to Configure GRE from Router Two 2104 can be transmitted wirelessly in a manner similar to that described in connection with FIG. 2C (e.g., using exclusively the wireless service of the wireless network carrier, without the information going on the Internet).

Still referring to FIG. 2D, Router One 2102 can transmit to Router Two 2104 information for Static Routes (see the upper arrow 6 in this FIG). This information for Static Routes can compromise respective Peers information (e.g., Remote LAN subnet). The information for Static Routes can be transmitted wirelessly from Router One 2102 to Router Two 2104 in a manner similar to that described in connection with FIG. 2C (e.g., using exclusively the wireless service of the wireless network carrier, without the information going on the Internet).

Still referring to FIG. 2D, Router Two 2104 can transmit to Router One 2102 information for Static Routes (see the lower arrow 6 in this FIG). This information for Static Routes can be, for example, in response to the information for Static Routes from Router One 2102. This information for Static Routes from Router Two 2104 can compromise respective Peers information (e.g., Remote LAN subnet). This information for Static Routes from Router Two 2104 can be transmitted wirelessly in a manner similar to that described in connection with FIG. 2C (e.g., using exclusively the wireless service of the wireless network carrier, without the information going on the Internet).

Still referring to FIG. 2D, Router One 2102 can transmit to Router Two 2104 information for L2TP Tunnel (see the upper arrow 7 in this FIG). This information for L2TP Tunnel can compromise respective Peers information (e.g., Remote WAN IP). The information for L2TP Tunnel can be transmitted wirelessly from Router One 2102 to Router Two 2104 in a manner similar to that described in connection with FIG. 2C (e.g., using exclusively the wireless service of the wireless network carrier, without the information going on the Internet).

Still referring to FIG. 2D, Router Two 2104 can transmit to Router One 2102 information for L2TP Tunnel (see the lower arrow 7 in this FIG). This information for L2TP Tunnel can be, for example, in response to the information for L2TP Tunnel from Router One 2102. This information for L2TP Tunnel from Router Two 2104 can compromise respective Peers information (e.g., Remote WAN IP). This information for L2TP Tunnel from Router Two 2104 can be transmitted wirelessly in a manner similar to that described in connection with FIG. 2C (e.g., using exclusively the wireless service of the wireless network carrier, without the information going on the Internet).

Figure 2E:
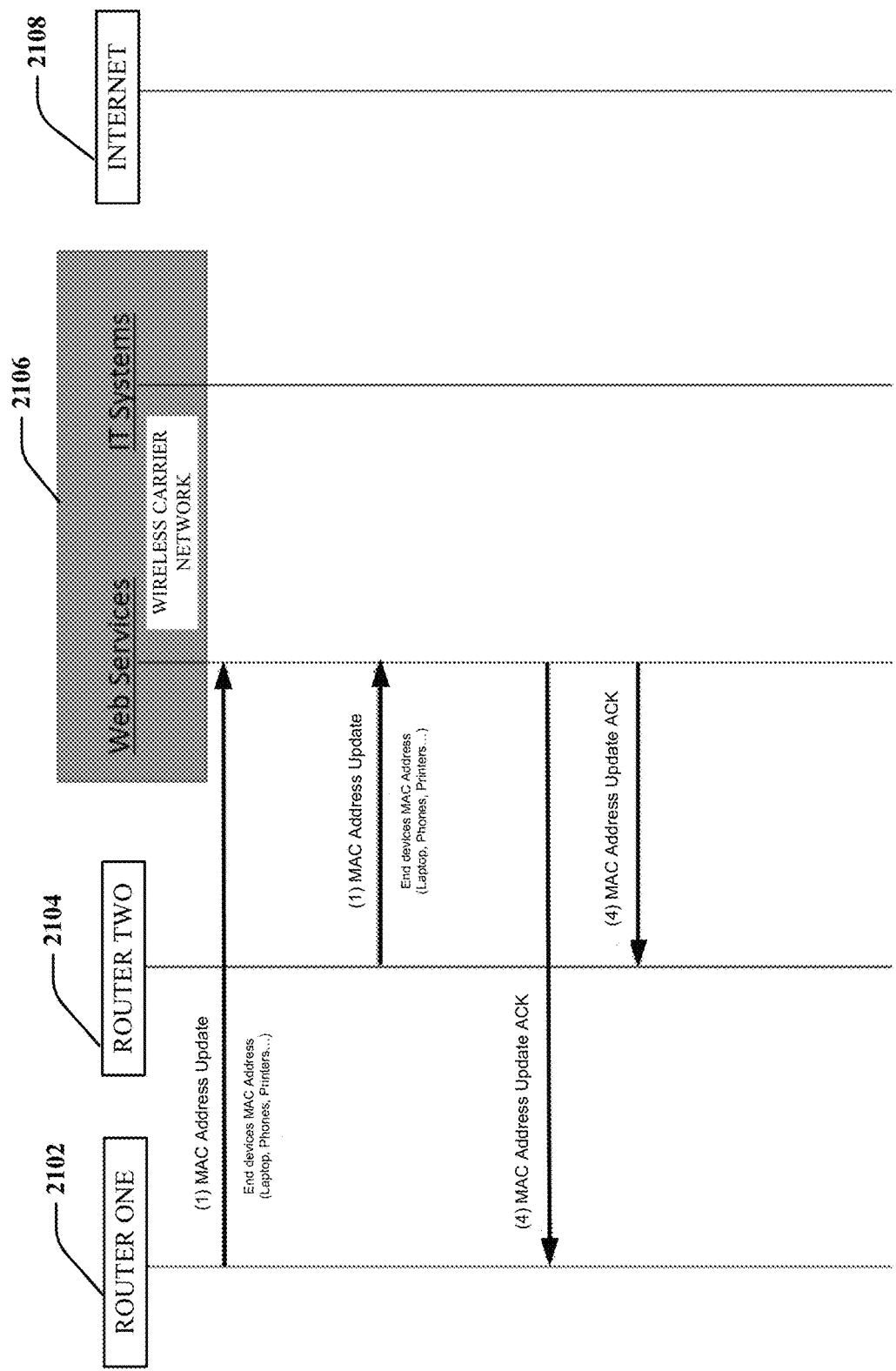
FIG. 2E is a diagram illustrating an example, non-limiting embodiment (Mac Addresses Update) that can function (fully or partially) within the communication network of FIG. 1 in accordance with various aspects described herein.

Referring now to FIG. 2E, this is a diagram 2200 illustrating an example, non-limiting embodiment (Mac Addresses Update) that can function (fully or partially) within the communication network of FIG. 1 in accordance with various aspects described herein. In this FIG. 2E., each of the Router One 2102, Router Two 2104, Wireless Carrier Network 2106, and Internet 2108 can correspond to the respective elements of FIG. 2C. For the purposes of this example, it is assumed that Router One 2102 and Router Two 2104 have already been registered (e.g., using the process shown in FIG. 2C).

Still referring to FIG. 2E, both Router One 2102 and Router Two 2104 are in operative bi-directional communication with Wireless Carrier Network 2106. Router One 2102 can transmit a Mac Address Update (see the upper arrow 1 of this FIG.) to the Wireless Carrier Network 2106. The Mac Address Update from Router One 2102 can be transmitted wirelessly to one or more servers of Wireless Carrier Network 2106 in a manner similar to that described in connection with FIG. 2C. In various examples, this Mac Address Update can comprise MAC addresses for End Devices connected Router One 2102 (e.g., a MAC address for each End Device). Such End Devices can comprise, for example, laptops, smartphones, printers, etc. Further, Router One 2102 can receive from Wireless Carrier Network 2106 (see the upper arrow 4 in this FIG.) a Mac Address Update Acknowledgement. The Mac Address Update Acknowledgement can be transmitted to Router One 2102 from one or more servers of Wireless Carrier Network 2106 in a manner similar to that described in connection with FIG. 2C.

Still referring to FIG. 2E, Router Two 2104 can transmit a Mac Address Update (see the lower arrow 1 of this FIG.) to the Wireless Carrier Network 2106. The Mac Address Update from Router Two 2104 can be transmitted wirelessly to one or more servers of Wireless Carrier Network 2106 in a manner similar to that described in connection with FIG. 2C. In various examples, this Mac Address Update can comprise MAC addresses for End Devices connected Router Two 2104 (e.g., a MAC address for each End Device). Such End Devices can comprise, for example, laptops, smartphones, printers, etc. Further, Router Two 2104 can receive from Wireless Carrier Network 2106 (see the lower arrow 4 in this FIG.) a Mac Address Update Acknowledgement. The Mac Address Update Acknowledgement can be transmitted to Router Two 2104 from one or more servers of Wireless Carrier Network 2106 in a manner similar to that described in connection with FIG. 2C.

Figure 2F:
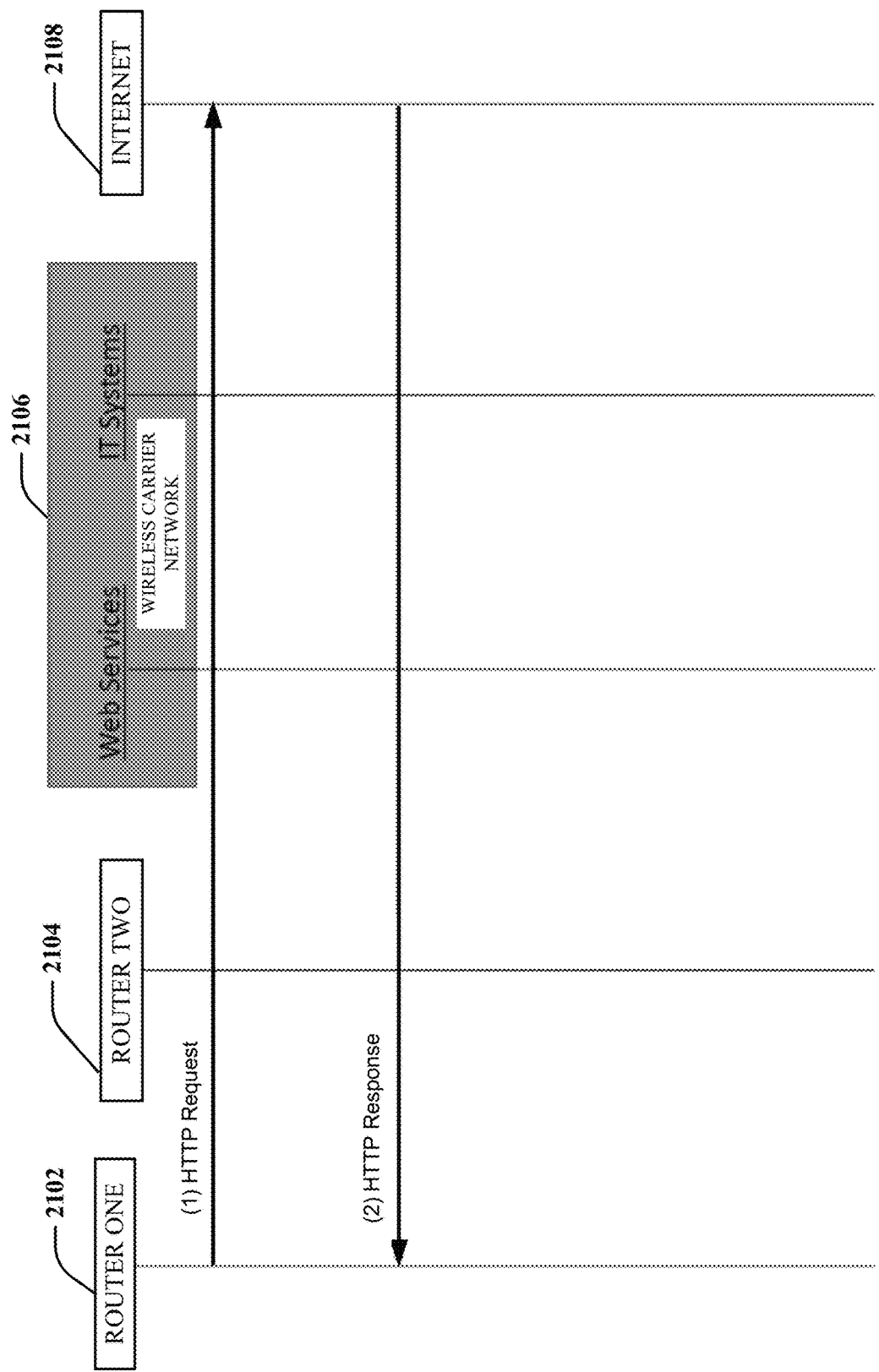
FIG. 2F is a diagram illustrating an example, non-limiting embodiment (Internet Call Flow (HTTP)) that can function (fully or partially) within the communication network of FIG. 1 in accordance with various aspects described herein.

Referring now to FIG. 2F, this is a diagram 2250 illustrating an example, non-limiting embodiment (Internet Call Flow (HTTP)) that can function (fully or partially) within the communication network of FIG. 1 in accordance with various aspects described herein. In this FIG. 2F, each of the Router One 2102, Router Two 2104, Wireless Carrier Network 2106, and Internet 2108 can correspond to the respective elements of FIG. 2C. For the purposes of this example, it is assumed that Router One 2102 and Router Two 2104 have already been registered (e.g., using the process shown in FIG. 2C).

Still referring to FIG. 2F, both Router One 2102 and Router Two 2104 are in operative bi-directional communication with Wireless Carrier Network 2106. In this example, Router One 2102 transmits an HTTP Request (see the arrow 1 of this FIG.) via the Internet. In response, Router One 2102 receives an HTTP Response (see the arrow 2 of this FIG.) via the Internet.

Referring now to FIG. 2G, this is a diagram 2300 illustrating an example, non-limiting embodiment (Intranet Call Flow (HTTP)) that can function (fully or partially) within the communication network of FIG. 1 in accordance with various aspects described herein. In this FIG. 2G, each of the Router One 2102, Router Two 2104, Wireless Carrier Network 2106, and Internet 2108 can correspond to the respective elements of FIG. 2C. For the purposes of this example, it is assumed that Router One 2102 and Router Two 2104 have already been registered (e.g., using the process shown in FIG. 2C).

Still referring to FIG. 2G, both Router One 2102 and Router Two 2104 are in operative bi-directional communication with Wireless Carrier Network 2106. In this example, Router One 2102 transmits an HTTP Request (see the arrow 1 of this FIG.) to Router Two 2104. This HTTP Request can be transmitted wirelessly from Router One 2102 to Router Two 2104 in a manner similar to that described in connection with FIG. 2C (e.g., using exclusively the wireless service of the wireless network carrier, without the information going on the Internet).

Still referring to FIG. 2G, Router Two 2104 transmits (e.g., in response to the HTTP Request from Router One 2102) an HTTP Response (see the arrow 2 of this FIG.) to Router One 2102. This HTTP Response can be transmitted wirelessly from Router Two 2104 to Router One 2102 in a manner similar to that described in connection with FIG. 2C (e.g., using exclusively the wireless service of the wireless network carrier, without the information going on the Internet).

Figure 2H:
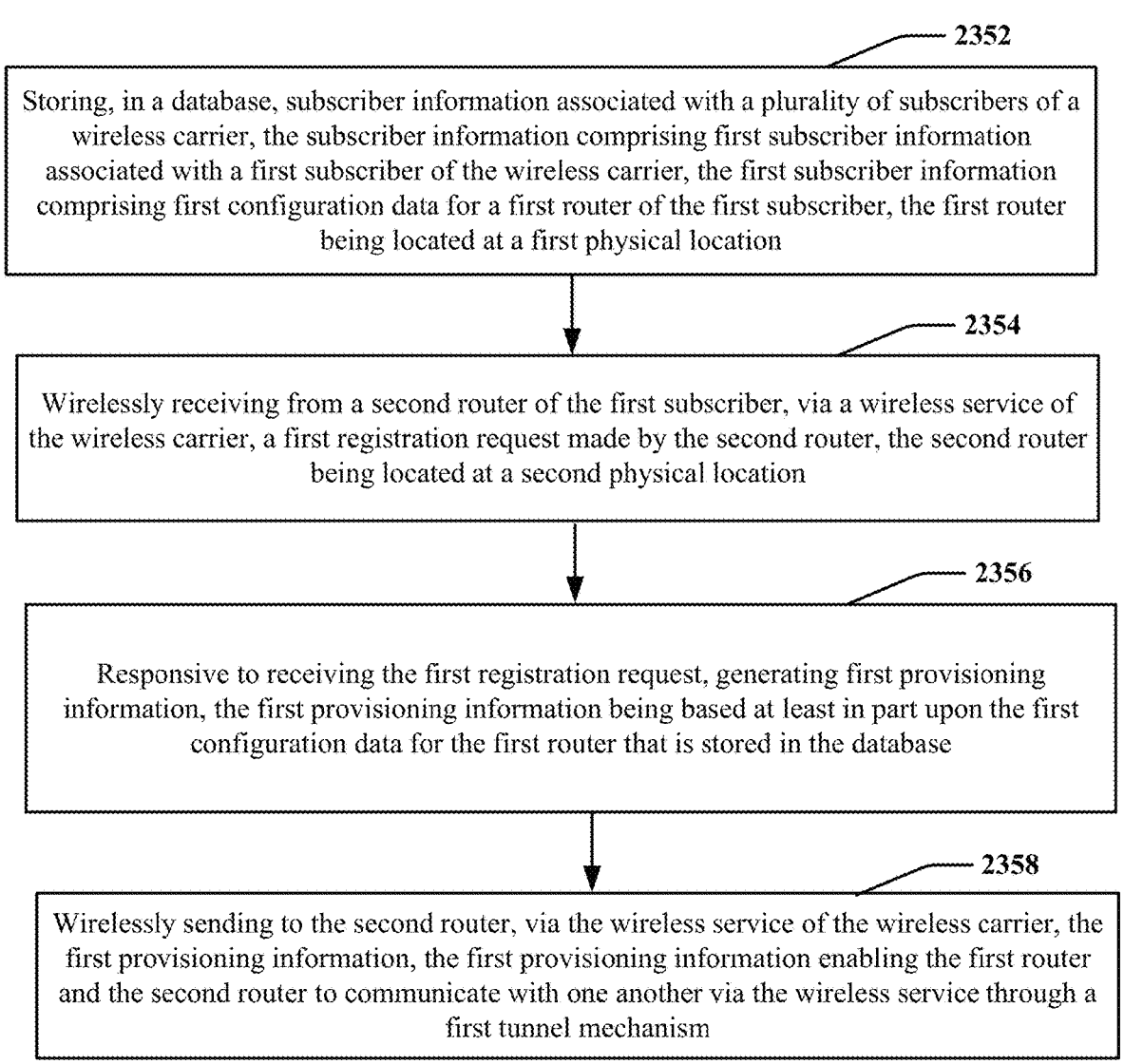
FIG. 2H depicts an illustrative embodiment of a method in accordance with various aspects described herein.
Figure 21:
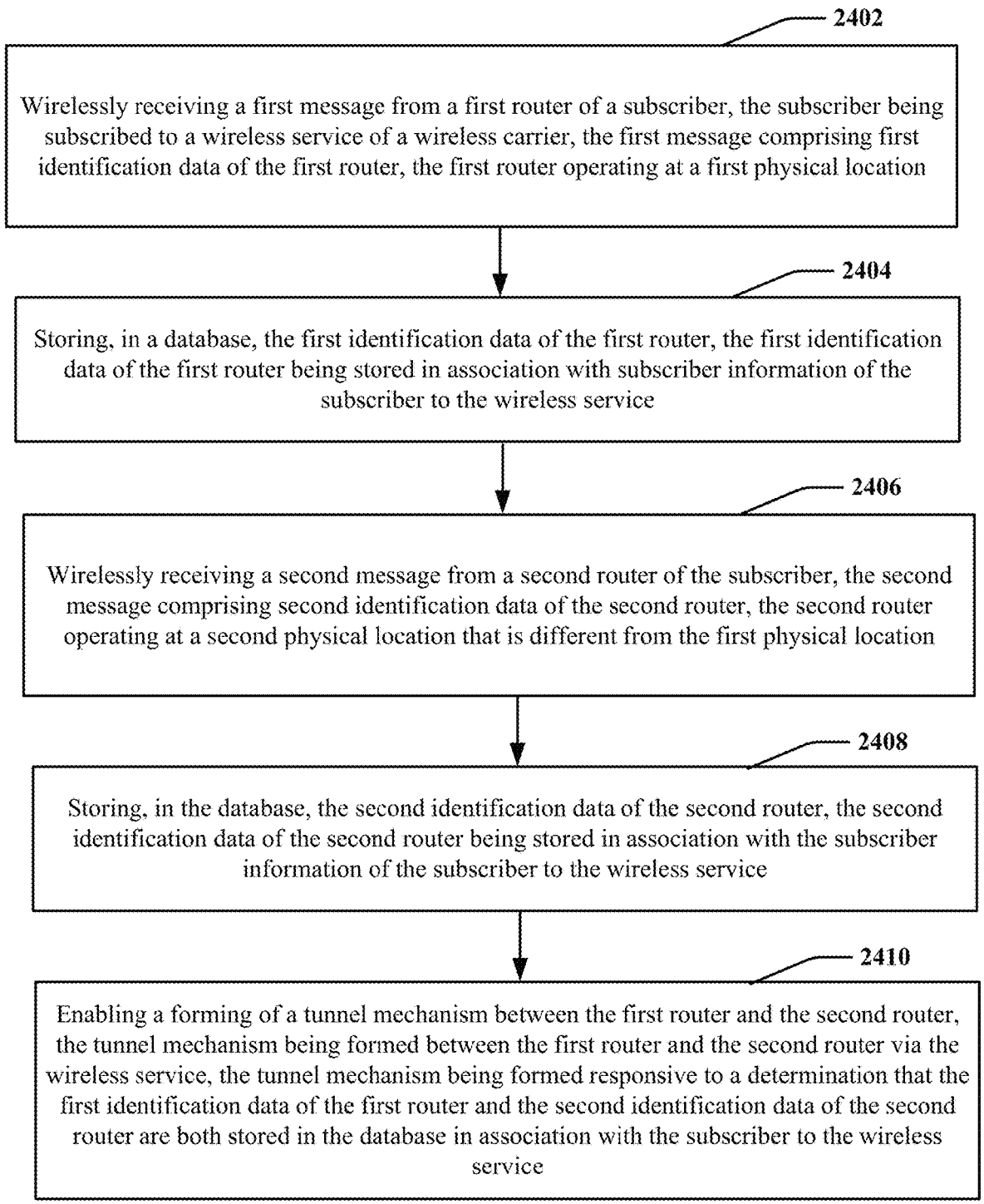

Referring now to FIG. 2H, various steps of a method 2350 according to an embodiment are shown. As seen in this FIG. 2H, step 2352 comprises storing, in a database, subscriber information associated with a plurality of subscribers of a wireless carrier, the subscriber information comprising first subscriber information associated with a first subscriber of the wireless carrier, the first subscriber information comprising first configuration data for a first router of the first subscriber, the first router being located at a first physical location. Next, step 2354 comprises wirelessly receiving from a second router of the first subscriber, via a wireless service of the wireless carrier, a first registration request made by the second router, the second router being located at a second physical location. Next, step 2356 comprises responsive to receiving the first registration request, generating first provisioning information, the first provisioning information being based at least in part upon the first configuration data for the first router that is stored in the database. Next, step 2358 comprises wirelessly sending to the second router, via the wireless service of the wireless carrier, the first provisioning information, the first provisioning information enabling the first router and the second router to communicate with one another via the wireless service through a first tunnel mechanism.

While for purposes of simplicity of explanation, the respective processes are shown and described as a series of blocks in FIG. 2H, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Referring now to FIG. 2I, various steps of a method 2400 according to an embodiment are shown. As seen in this FIG. 2I, step 2402 comprises wirelessly receiving a first message from a first router of a subscriber, the subscriber being subscribed to a wireless service of a wireless carrier, the first message comprising first identification data of the first router, the first router operating at a first physical location. Next, step 2404 comprises storing, in a database, the first identification data of the first router, the first identification data of the first router being stored in association with subscriber information of the subscriber to the wireless service. Next, step 2406 comprises wirelessly receiving a second message from a second router of the subscriber, the second message comprising second identification data of the second router, the second router operating at a second physical location that is different from the first physical location. Next, step 2408 comprises storing, in the database, the second identification data of the second router, the second identification data of the second router being stored in association with the subscriber information of the subscriber to the wireless service. Next, step 2410 comprises enabling a forming of a tunnel mechanism between the first router and the second router, the tunnel mechanism being formed between the first router and the second router via the wireless service, the tunnel mechanism being formed responsive to a determination that the first identification data of the first router and the second identification data of the second router are both stored in the database in association with the subscriber to the wireless service.

While for purposes of simplicity of explanation, the respective processes are shown and described as a series of blocks in FIG. 2I, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Referring now to FIG. 2J, various steps of a method 2450 according to an embodiment are shown. As seen in this FIG. 2J, step 2452 comprises wirelessly transmitting by a first router having a processing system including a processor, exclusively via a wireless service of a wireless carrier, a registration request to a network element of the wireless carrier that provides the wireless service, the registration request comprising a first International Mobile Equipment Identity (IMEI) of the first router, a first Mobile Station International Subscriber Directory Number (MSISDN) of the first router, or any combination thereof, the first router operating at a first physical location of a subscriber to the wireless service. Next, step 2454 comprises wirelessly receiving by the first router, exclusively via the wireless service of the wireless carrier, provisioning information, the provisioning information being provided by a server of the wireless carrier responsive to the network element of the wireless carrier having wirelessly received the registration request, the provisioning information comprising configuration data from a database of the wireless carrier, the configuration data being obtained from the database based upon the first router being associated in the database with a second router of the subscriber to the wireless service, the second router operating at a second physical location that is different from the first physical location, the configuration data identifying a network location of the second router, the provisioning information enabling the first router and the second router to communicate with one another via the wireless service through a tunnel mechanism that extends between the first router and the second router exclusively over the wireless service.

While for purposes of simplicity of explanation, the respective processes are shown and described as a series of blocks in FIG. 2J, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 2K:
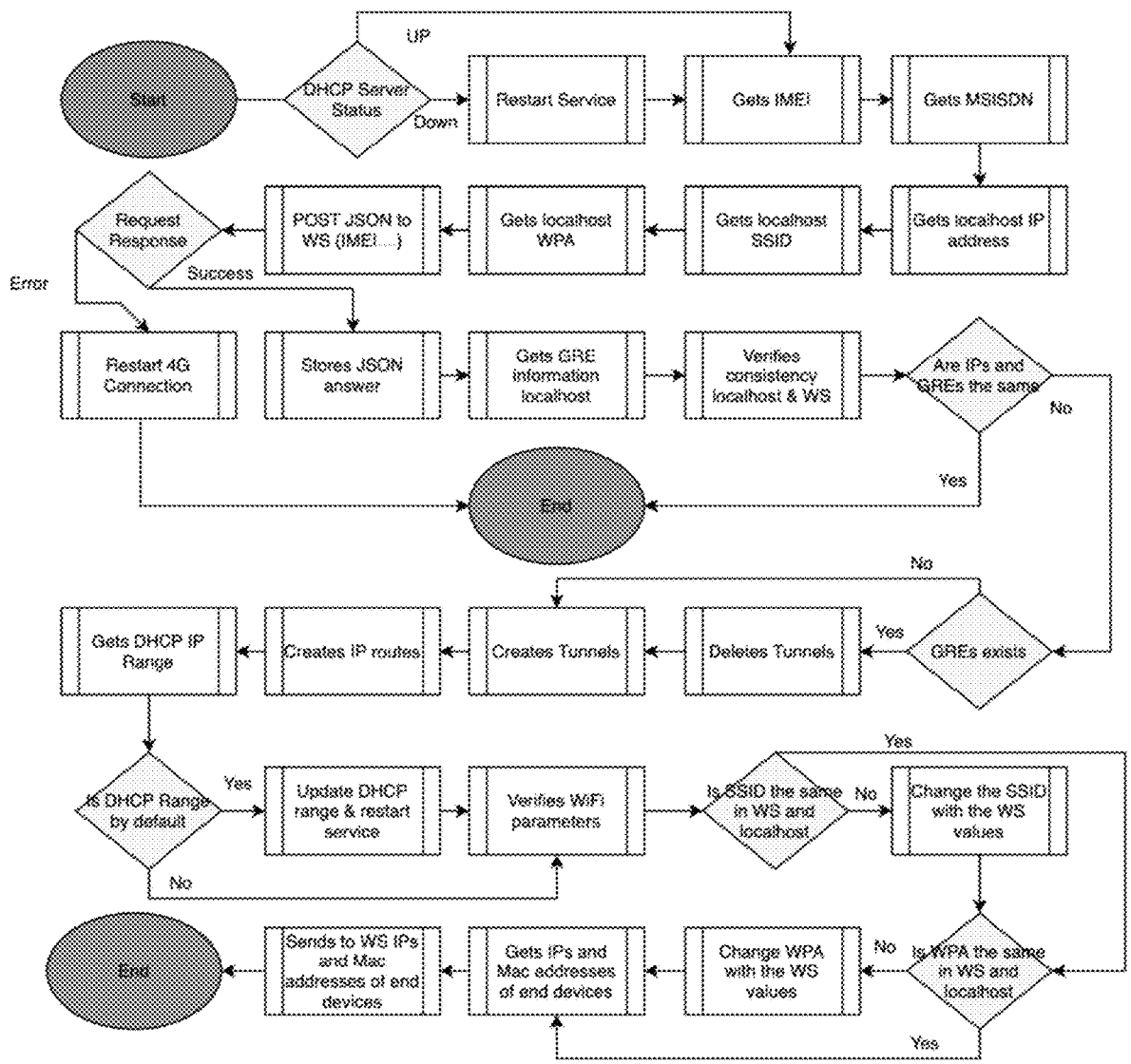
FIG. 2K, is a diagram illustrating an example, non-limiting embodiment of a smart router process flow that can function (fully or partially) within the communication network of FIG. 1 in accordance with various aspects described herein.

Referring now to FIG. 2K, this is a diagram 2500 illustrating an example, non-limiting embodiment of a smart router process flow that can function (fully or partially) within the communication network of FIG. 1 in accordance with various aspects described herein. As seen in this FIG. 2K, the process can begin at "Start". From there, the DHCP Server Status can be determined. If "Up", flow then goes to "Gets IMEI". If "Down", flow then goes to "Restart Service" and then to "Gets IMEI". Flow then goes to "Gets MSISDN", "Gets localhost IP address", "Gets localhost SSID", "Gets localhost Wi-Fi Protected Access (WPA), "POST JSON to Web Service (WS) (IMEI . . . )" and "Request Response". If "Error", flow then goes to "Restart 4G Connection" and "End". If "Success", flow then goes to "Stores JSON answer", "Gets GRE Information localhost", "Verifies Consistency localhost & WS", and "Are IP's and GRE's the same". If "Yes, flow then goes to "End". If "No", flow then goes to "GREs exists". If "No", flow then goes to "Creates Tunnels". If "Yes", flow then goes to "Deletes Tunnels" and "Creates Tunnels". Flow then goes to "Creates IP routes", "Gets DHCP IP Range" and "Is DHCP Range by default". If "No", flow then goes to "Verifies WiFi parameters". If "Yes", flow then goes to "Update DHCP range & restart service" and "Verifies WiFi parameters". Flow then goes to "Is SSID the same in WS and localhost". If "Yes", flow then goes to "Is WPA the same in WS and localhost". If "No", flow goes to "Change the SSID with the WS values and "Is WPA the same in WS and localhost". If "Yes", flow then goes to "Gets IPs and Mac addresses of end devices". If "No", flow then goes to "Change WPA with the WS values" and "Gets IPs and Mac addresses of end devices". Flow then goes to "Sends to WS IPs and Mac addresses of end devices" and then "End".

Figure 2L:
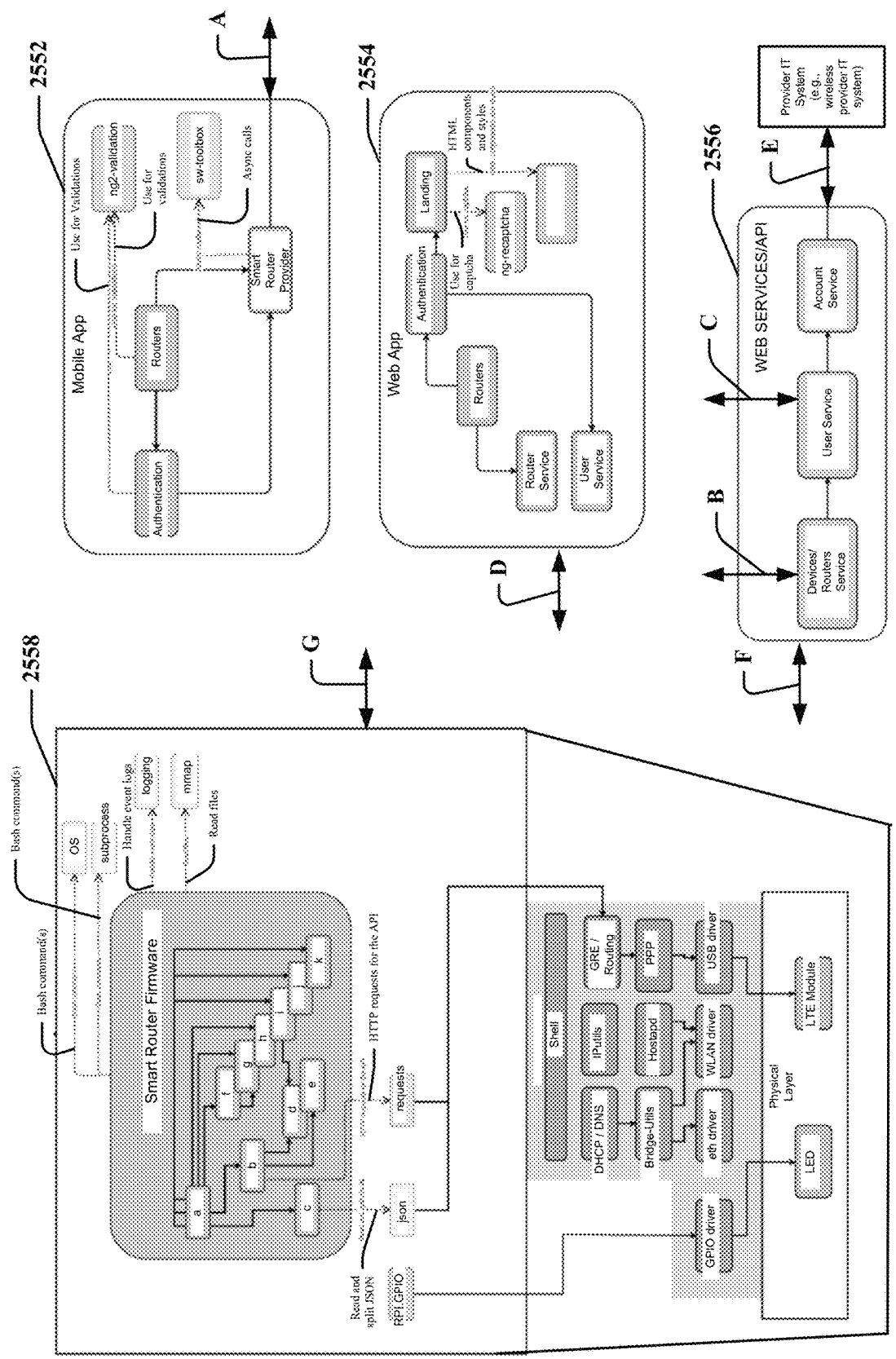
FIG. 2L, is a diagram illustrating an example, non-limiting embodiment of an architectural configuration that can function (fully or partially) within the communication network of FIG. 1 in accordance with various aspects described herein.

Referring now to FIG. 2L, this is a diagram 2550 illustrating an example, non-limiting embodiment of an architectural configuration that can function (fully or partially) within the communication network of FIG. 1 in accordance with various aspects described herein. As seen in this FIG. 2L, a Mobile App 2552 can be provided. Further, a Web App 2554 can be provided. Further still, a Web Services/API 2556 can be provided. Further still, a Smart Router 2558 can be provided.

Still referring to FIG. 2L, the Mobile App 2552 can comprise a Routers element that provides output to an Authentication element, to a Validation Element, and to a Smart Router Provider element. The Authentication element can also provide output to the Smart Router Provider element. The Smart Router Provider element can provide output via asynchronous calls to an sw-toolbox element and the Smart Router Element can provide output from the Mobile App 2552 (see the arrow "A" leaving the Mobile App 2552). Via arrow "A" the Mobile App 2552 can communication (uni-directionally or bi-directionally) with Web Services/API 2556 (see, for example, arrows "B" and "C" of Web Services/API 2556) In one example, communication between Mobile App 2552 and Web Services/API 2556 can be for Smart Router Services that are communicated via the Internet (e.g., fixed line and/or wireless).

Still referring to FIG. 2L, Web App 2554 can comprise a Routers element that provides output to a Router Service element and to an Authentication element. The Authentication element can provide output to a User Service element and to a Landing element. The Landing element can provide output (that is used for captcha) to a recaptcha element. The Landing element can also provide HTML components and styles as output. Via arrow "D" the Web App 2554 can communication (uni-directionally or bi-directionally) with Web Services/API 2556 (see, for example, arrows "B" and "C" of Web Services/API 2556) In one example, communication between Web App 2554 and Web Services/API 2556 can be for Smart Router Services that are communicated via the Internet (e.g., fixed line and/or wireless).

Still referring to FIG. 2L, the Mobile App 2552 and/or the Web App 2554 can comprise a user interface feature. The user interface feature can allow respective users to perform configuration tasks (e.g., password management).

Still referring to FIG. 2L, Web Services/API 2556 can comprise a Devices/Routers Service element (that communicates as described herein via arrow "B"). Devices/Routers Service element can provide output to a User Service element (that communicates as described herein via arrow "C"). User Service element can provide output to Account Service element. Account Service element can provide output (via arrow "E") to Provider IT System (e.g., wireless provider IT system). The communication with Provider IT System via arrow "E" can be uni-directionally or bi-directionally. In one example, communication between Web Services/API 2556 and the Provider IT System can be via the Internet (e.g., fixed line and/or wireless). In one example, each user can access the Services/API 2556 via a unique User ID.

Still referring to FIG. 2L, the Smart Router 2558 can comprise Smart Router Firmware. The Smart Router Firmware can comprise the following interconnected elements: (a) FirmwareSR element; (b) Request element; (c) JSONData element; (d) LTE element; (e) BrandNew element; (f) DataStore element; (g) Tunnels element; (h) FindIP element; (i) DHCP element; (j) WLAN element; (K) ReadFile element.

Still referring to FIG. 2L, the Smart Router Firmware of the Smart Router 2558 can provide Bash Command(s) to an OS element and can provide bash Command(s) to a subprocess element. Further, the Smart Router Firmware of the Smart Router 2558 can provide information to a logging element to handle event logs and can provide Read files to an mmap element. Further still, the Smart Router Firmware of the Smart Router 2558 can provide information to a JSON element to read and split JSON data. Further still, the Smart Router Firmware of the Smart Router 2558 can provide HTTP requests for the API to a requests element. Further still, an RPI.GPIO element can provide output to a GPIO driver (see the lower portion of the block diagram of the Smart Router 2558).

Still referring to FIG. 2L, the Smart Router 2558 can comprise (see the lower portion of the block diagram of the Smart Router 2558) a Physical Layer. Further, the Smart Router 2558 can comprise the following elements (some of which are interconnected as shown in the block diagram): Shell; DHCP/DNS element; IPutils element; GRE/Routing element; Bridge-Utils element; Hostapd element; PPP element; eth driver element; WLAN driver element; and USB driver element. Further still. the Smart Router 2558 can comprise an LED element and an LTE Module element. Further still, communication between various elements of the Smart Router 2558 can be uni-directional or bi-directional. Further still, the GPIO diver can communicate with the LED element. Further still, the USB diver (and/or any other applicable driver(s)) can communicate with the LTE Module element.

Still referring to FIG. 2L, the Smart Router 2558 can communicate (uni-directionally or bi-directionally) via arrow "G" with one or more of: the Mobile App 2552 (see, e.g., arrow "A"); the Web App 2554 (see, e.g. arrow "D")' the Web Services/API 2556 (see, e.g., arrow "F"). The communication by the Smart Router 2558 the Mobile App 2552, the Web App 2554, the Web Services/API 2556, or any combination thereof can be via the Internet (e.g., fixed line and/or wireless).

Figure 2M:
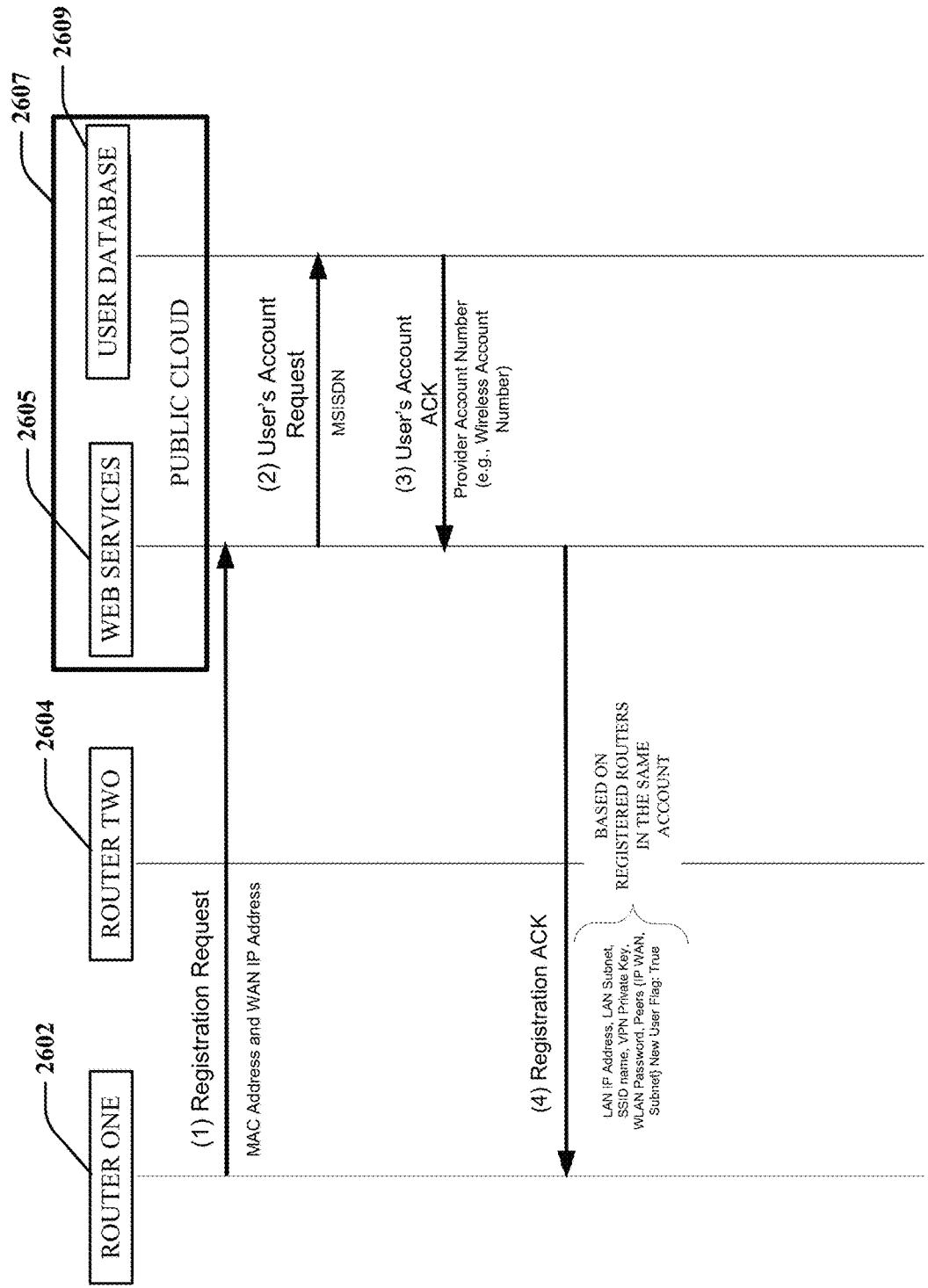
FIG. 2M is a diagram illustrating an example, non-limiting embodiment (Registration Flow-New Router) that can function (fully or partially) within the communication network of FIG. 1 in accordance with various aspects described herein.

Referring now to FIG. 2M, this is a diagram 2600 illustrating an example, non-limiting embodiment ((Registration Flow-New Router) that can function (fully or partially) within the communication network of FIG. 1 in accordance with various aspects described herein. As seen in this FIG. 2M, Router One 2602 is in operative bi-directional communication with Web Services 2605 (these Web Services can be, for example, provided by a Wireless Carrier). Further, while this example registration process is described here for Router One 2602, such a process can also apply to Router Two 2604. In addition, while two routers are shown in this example, any desired number of routers may be supported. In one example, Router One 2602 can be physically located in a first location that is used by and/or operated by a business entity and Router Two 2604 can be physically located in a second location that is used by and/or operated by the business entity. The first location can be physically remote from the second location. For instance, the first and second locations can be in different buildings. Further, the Public Cloud 2607 (e.g., comprising the Internet) can be used for certain communications as described herein.

Still referring to FIG. 2M, Router One 2602 can transmit a Registration Request (see arrow 1 of this FIG.) to the Web Services 2605. In various examples, the Registration Request can comprise a MAC Address of Router One 2602, a WAN IP Address of Router One 2602, or any combination thereof. In one example, the Registration Request from Router One 2602 can be transmitted by fixed line to one or more servers of a provider of Web Services 2605. In another example, the Registration Request from Router One 2602 can be transmitted wirelessly to one or more servers of a provider of Web Services 2605. In one specific example, the wireless transmission of the Registration Request from Router One 2602 to Web Services 2605 can be carried out by Router One 2602 using only the wireless functionality provided by provider of Web Services 2605. In another specific example, the wireless transmission of the Registration Request from Router One 2602 to the Web Services 2605 can be carried out by Router One 2602 using only elements operated by and/or controlled by the provider of Web Services 2605 (e.g., without sending any information over the Internet).

Still referring to FIG. 2M, the Web Services 2605 can transmit (responsive to receipt of the Registration Request) a User's Account Request (see arrow 2 of this FIG.) to a User Database 2609. In one example, the User's Account Request can comprise the MSISDN of Router One 2602. Further, responsive to the User's Account Request, the User Database 2609 can transmit a User's Account Acknowledgement (see arrow 3 of this FIG.). In one example, the User's Account Acknowledgement can comprise a Provider Account Number (e.g., Wireless Carrier Account Number) associated with a subscriber to communication services of the provider that operates the Web Services 2605. The subscriber can be, for example, a business entity that utilizes Router One 2602 and Router Two 2604. In one specific example, the communication between the Web Services 2605 and the User Database 2609 can be via the Public Cloud 2607 (e.g., comprising the Internet).

Still referring to FIG. 2M, the Web Services 2605 can transmit back to Router One 2602 (responsive to receipt of the Provider Account Number) a Registration Acknowledgement (see arrow 4 of this FIG.). The Registration Acknowledgement can comprise information that is based on one or more routers in (or associated with) the same account (the same account with the communication provider (such as the same account with a wireless carrier)). In one example, the Registration Acknowledgement can comprise information that is based on the account of the subscriber (e.g., the business entity that utilizes Router One 2602 and Router Two 2604). In various examples, the Registration Acknowledgement can comprise for Router One 2602 a LAN IP Address, a LAN Subnet, a Service Set Identifier (SSID) name, a VPN private key, a WLAN password, various Peers information (e.g., IP WAN, Subnet), a New User (e.g., new router) Flag, or any combination thereof. In one example, the Registration Acknowledgement to Router One 2602 can be transmitted by fixed line from one or more servers of a provider of Web Services 2605. In another example, the Registration Acknowledgement from Web Services 2605 to Router One 2602 can be transmitted wirelessly from one or more servers of a provider of Web Services 2605. In one specific example, the wireless transmission of the Registration Acknowledgement to Router One 2602 from Web Services 2605 can be carried out by Web Services 2605 using only the wireless functionality provided by the provider of Web Services 2605. In another specific example, the wireless transmission of the Registration Acknowledgement to Router One 2602 from Web Services 2605 can be carried out by Web Services 2605 using only elements operated by and/or controlled by the provider of Web Services 2605 (e.g., without sending any information over the Internet).

Figure 2N:
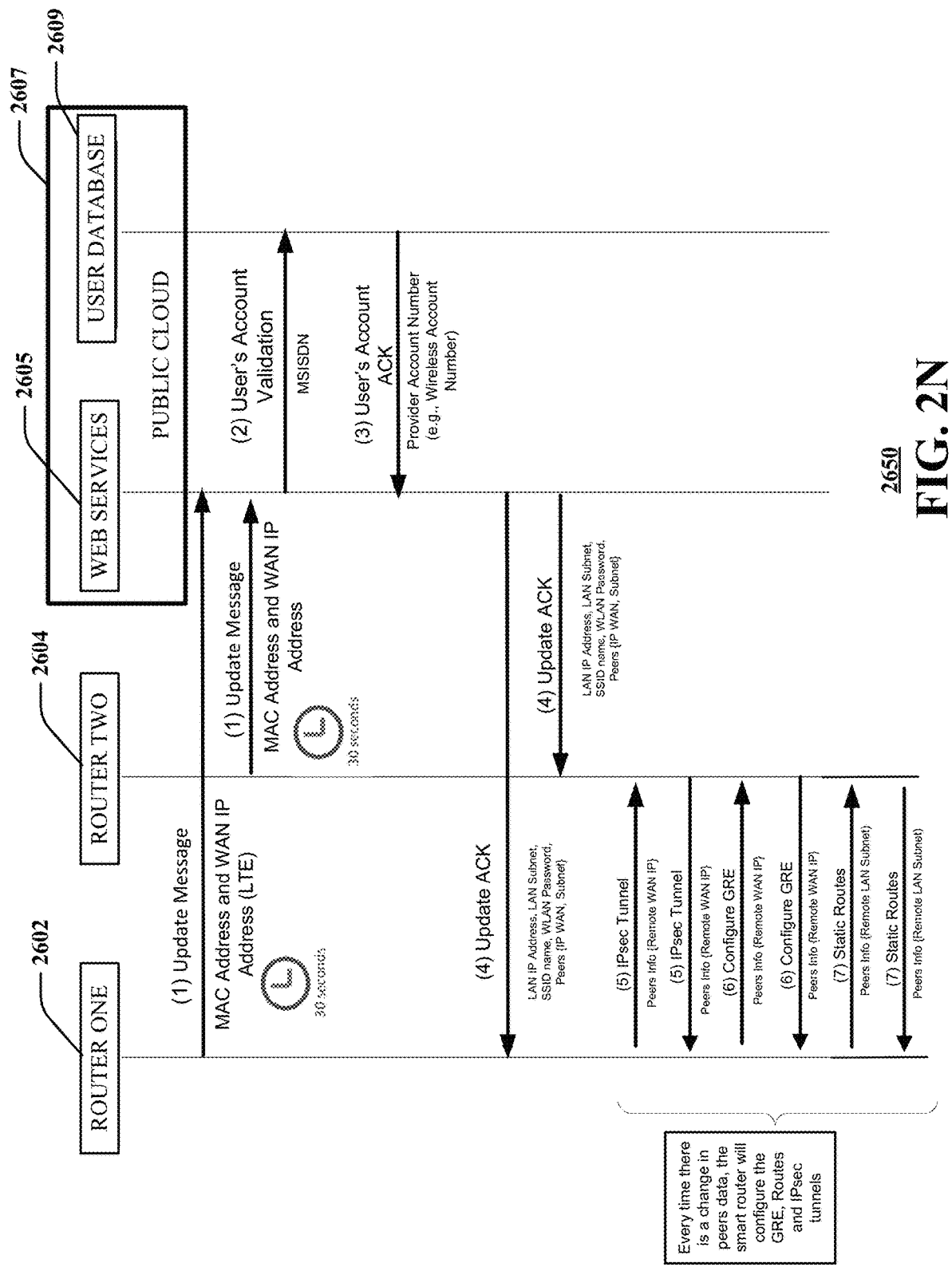
FIG. 2N is a diagram illustrating an example, non-limiting embodiment (Encapsulation/Tunneling) that can function (fully or partially) within the communication network of FIG. 1 in accordance with various aspects described herein.
Figure 20:
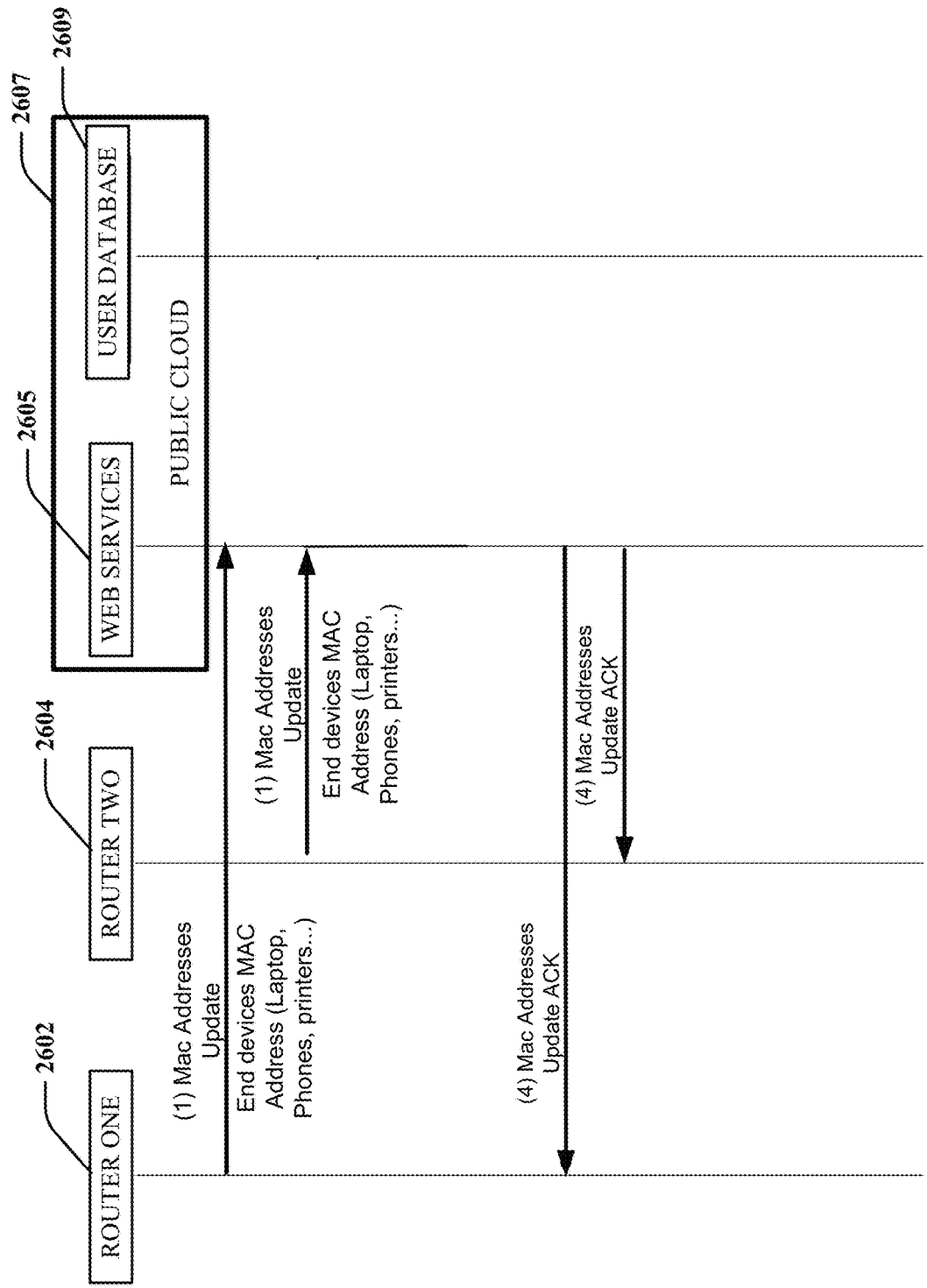

Referring now to FIG. 2N this is a diagram 2650 illustrating an example, non-limiting embodiment (Encapsulation/Tunneling) that can function (fully or partially) within the communication network of FIG. 1 in accordance with various aspects described herein. In this FIG. 2N, each of the Router One 2602, Router Two 2604, Web Services 2605, Public Cloud 2607 and User Database 2609 can correspond to the respective elements of FIG. 2M. For the purposes of this example, it is assumed that Router One 2602 and Router Two 2604 have already been registered (e.g., using the process shown in FIG. 2M).

Still referring to FIG. 2N, both Router One 2602 and Router Two 2604 are in operative bi-directional communication with Web Services 2605. Router One 2602 can transmit an Update Message (see the upper arrow 1 of this FIG.) to the Web Services 2605. The Update Message from Router One 2602 can be transmitted wirelessly and/or via fixed line to one or more servers of Web Services 2605 as described in a manner similar to that described in connection with FIG. 2M. In various examples, this Update Message can comprise a MAC Address and WAN IP Address (LTE) of Router One 2602. In the example shown, this Update Message can be transmitted every 30 seconds (of course, such an Update Message can be transmitted at any desired frequency (e.g., every 10 seconds, every 60 seconds, every 5 minutes) or at any non-periodic time interval).

Still referring to FIG. 2N, Router Two 2604 can transmit an Update Message (see the lower arrow 1 of this FIG.) to the Web Services 2605. The Update Message from Router Two 2604 can be transmitted wirelessly and/or via fixed line to one or more servers of Web Services 2605 as described in a manner similar to that described in connection with FIG. 2M. In various examples, this Update Message can comprise a MAC Address and WAN IP Address (LTE) of Router Two 2604. In the example shown, this Update Message can be transmitted every 30 seconds (of course, such an Update Message can be transmitted at any desired frequency (e.g., every 10 seconds, every 60 seconds, every 5 minutes) or at any non-periodic time interval). The timing of each respective Update Message from each router can be synchronized or non-synchronized.

Still referring to FIG. 2N, the Web Services 2605 can transmit (responsive to receipt of the Update Messages) a User's Account Validation (see arrow 2 of this FIG.) to the User Database 2609. While a single arrow 2 is shown in this FIG., it is to be understood that a distinct User's Account Validation can be sent for each Update Message. In one example, one User's Account Validation (that corresponds to the Update Message from Router One 2602) can comprise the MSISDN of Router One 2602 and another (different) User's Account Validation (that corresponds to the Update Message from Router Two 2604) can comprise the MSISDN of Router Two 2604. Further, responsive to each User's Account Validation, the User Database 2609 can transmit a User's Account Acknowledgement (see arrow 3 of this FIG.). While a single arrow 3 is shown in this FIG. it is to be understood that a distinct User's Account Acknowledgement can be sent for each Update Message. In one example, one User's Account Acknowledgement (that corresponds to the Update Message from Router One 2602) can comprise the Provider Account Number associated with the subscriber to the wireless and/or fixed line services of the provider (e.g., that operates the Web Services 2605) and another User's Account Acknowledgement (that corresponds to the Update Message from Router Two 2604) can also comprise the Provider Account Number associated with the subscriber to the wireless and/or fixed line services of the provider (e.g., that operates the Web Services 2605). The subscriber can be, for example, the business entity that utilizes Router One 2602 and Router Two 2604.

Still referring to FIG. 2N, the Web Services 2605 can transmit back to Router One 2602 (responsive to receipt of the respective User's Account Acknowledgement) an Update Acknowledgement (see the upper arrow 4 of this FIG.). The Update Acknowledgement can comprise information that is based on the provider account of the subscriber (e.g., the business entity that utilizes Router One 2602 and Router Two 2604). In various examples, this Update Acknowledgement can comprise for Router One 2602 a LAN IP Address, a LAN Subnet, a Service Set Identifier (SSID) name, a WLAN password, various Peers information (e.g., IP WAN, Subnet), or any combination thereof. The Update Acknowledgement to Router One 2602 can be transmitted wirelessly and/or via fixed line from one or more servers of Web Services 2605 as described in a manner similar to that described in connection with FIG. 2M.

Still referring to FIG. 2N, the Web Services 2605 can transmit back to Router Two 2604 (responsive to receipt of the respective User's Account Acknowledgement) an Update Acknowledgement (see the lower arrow 4 of this FIG.). The Update Acknowledgement can comprise information that is based on the provider account of the subscriber (e.g., the business entity that utilizes Router One 2602 and Router Two 2604). In various examples, this Update Acknowledgement can comprise for Router Two 2604 a LAN IP Address, a LAN Subnet, a Service Set Identifier (SSID) name, a WLAN password, various Peers information (e.g., IP WAN, Subnet), or any combination thereof. The Update Acknowledgement to Router Two 2604 can be transmitted wirelessly and/or via fixed line from one or more servers of Web Services 2605 in a manner similar to that described in connection with FIG. 2M.

Still referring to FIG. 2N, Router One 2602 can transmit to Router Two 2604 information for IPsec Tunnel (see the upper arrow 5 in this FIG). This information for IPsec Tunnel can compromise respective Peers information (e.g., Remote WAN IP). The information for IPsec Tunnel can be transmitted wirelessly and/or via fixed line from Router One 2602 to Router Two 2604 in a manner similar to that described in connection with FIG. 2M.

Still referring to FIG. 2N, Router Two 2604 can transmit to Router One 2602 information for IPsec Tunnel (see the lower arrow 5 in this FIG). This information for IPsec Tunnel can be, for example, in response to the information for IPsec Tunnel from Router One 2602. This information for IPsec Tunnel from Router Two 2604 can compromise respective Peers information (e.g., Remote WAN IP). This information for IPsec Tunnel from Router Two 2604 can be transmitted wirelessly and/or via fixed line in a manner similar to that described in connection with FIG. 2M.

Still referring to FIG. 2N, Router One 2602 can transmit to Router Two 2604 information to Configure GRE (see the upper arrow 6 in this FIG). This information to Configure GRE can compromise respective Peers information (e.g., Remote WAN IP). The information to Configure GRE can be transmitted wirelessly and/or via fixed line from Router One 2602 to Router Two 2604 in a manner similar to that described in connection with FIG. 2M.

Still referring to FIG. 2N, Router Two 2604 can transmit to Router One 2602 information to Configure GRE (see the lower arrow 6 in this FIG). This information to Configure GRE can be, for example, in response to the information to Configure GRE from Router One 2602. This information to Configure GRE from Router Two 2604 can compromise respective Peers information (e.g., Remote WAN IP). This information to Configure GRE from Router Two 2604 can be transmitted wirelessly and/or via fixed line in a manner similar to that described in connection with FIG. 2M.

Still referring to FIG. 2N, Router One 2602 can transmit to Router Two 2604 information for Static Routes (see the upper arrow 7 in this FIG). This information for Static Routes can compromise respective Peers information (e.g., Remote LAN subnet). The information for Static Routes can be transmitted wirelessly and/or via fixed line from Router One 2602 to Router Two 2604 in a manner similar to that described in connection with FIG. 2M.

Still referring to FIG. 2N, Router Two 2604 can transmit to Router One 2602 information for Static Routes (see the lower arrow 7 in this FIG). This information for Static Routes can be, for example, in response to the information for Static Routes from Router One 2602. This information for Static Routes from Router Two 2604 can compromise respective Peers information (e.g., Remote LAN subnet). This information for Static Routes from Router Two 2604 can be transmitted wirelessly and/or via fixed line in a manner similar to that described in connection with FIG. 2M.

Referring now to FIG. 2O, this is a diagram 2700 illustrating an example, non-limiting embodiment (Mac Addresses Update) that can function (fully or partially) within the communication network of FIG. 1 in accordance with various aspects described herein. In this FIG. 2O, each of the Router One 2602, Router Two 2604, Web Services 2605, Public Cloud 2607 and User Database 2609 can correspond to the respective elements of FIG. 2M. For the purposes of this example, it is assumed that Router One 2602 and Router Two 2604 have already been registered (e.g., using the process shown in FIG. 2M).

Still referring to FIG. 2O, both Router One 2602 and Router Two 2604 are in operative bi-directional communication with Web Services 2605. Router One 2602 can transmit a Mac Addresses Update (see the upper arrow 1 of this FIG.) to the Web Services 2605. The Mac Addresses Update from Router One 2602 can be transmitted wirelessly and/or via fixed line to one or more servers of Web Services 2605 in a manner similar to that described in connection with FIG. 2M. In various examples, this Mac Addresses Update can comprise MAC addresses for End Devices connected to Router One 2602 (e.g., a MAC address for each End Device). Such End Devices can comprise, for example, laptops, smartphones, printers, etc. Further, Router One 2602 can receive from Web Services 2605 (see the upper arrow 4 in this FIG.) a Mac Addresses Update Acknowledgement. The Mac Addresses Update Acknowledgement can be transmitted to Router One 2602 from one or more servers of Web Services 2605 in a manner similar to that described in connection with FIG. 2M.

Still referring to FIG. 2O, Router Two 2604 can transmit a Mac Addresses Update (see the lower arrow 1 of this FIG.) to the Web Services 2605. The Mac Addresses Update from Router Two 2604 can be transmitted wirelessly and/or via fixed line to one or more servers of Web Services 2605 in a manner similar to that described in connection with FIG. 2M. In various examples, this Mac Addresses Update can comprise MAC addresses for End Devices connected to Router Two 2604 (e.g., a MAC address for each End Device). Such End Devices can comprise, for example, laptops, smartphones, printers, etc. Further, Router Two 2604 can receive from Web Services 2605 (see the lower arrow 4 in this FIG.) a Mac Addresses Update Acknowledgement. The Mac Addresses Update Acknowledgement can be transmitted wirelessly and/or via fixed line to Router Two 2604 from one or more servers of Web Services 2605 in a manner similar to that described in connection with FIG. 2M.

Figure 2P:
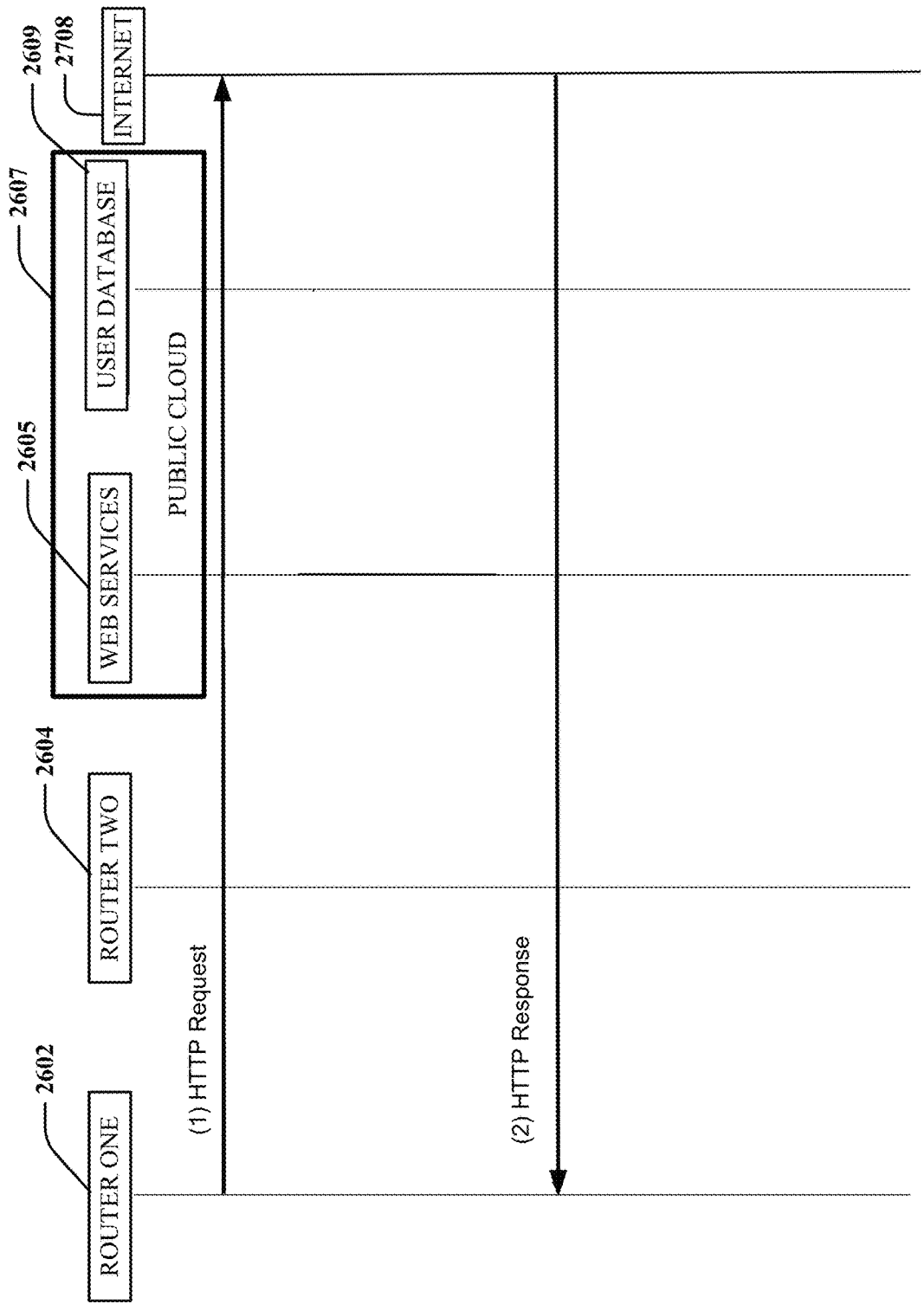
FIG. 2P is a diagram illustrating an example, non-limiting embodiment (Internet Call Flow (HTTP)) that can function (fully or partially) within the communication network of FIG. 1 in accordance with various aspects described herein.

Referring now to FIG. 2P, this is a diagram 2750 illustrating an example, non-limiting embodiment (Internet Call Flow (HTTP)) that can function (fully or partially) within the communication network of FIG. 1 in accordance with various aspects described herein. In this FIG. 2P, each of the Router One 2602, Router Two 2604, Web Services 2605, Public Cloud 2607, and User Database 2609 can correspond to the respective elements of FIG. 2M. In addition, this FIG. shows Internet 2708. For the purposes of this example, it is assumed that Router One 2602 and Router Two 2604 have already been registered (e.g., using the process shown in FIG. 2M).

Still referring to FIG. 2P, both Router One 2602 and Router Two 2604 are in operative bi-directional communication with Internet 2708. In this example, Router One 2602 transmits an HTTP Request (see the arrow 1 of this FIG.) via the Internet. This HTTP Request can be transmitted wirelessly and/or via fixed line from Router One 2602 in a manner similar to that described in connection with FIG. 2M. In response, Router One 2602 receives an HTTP Response (see the arrow 2 of this FIG.) via the Internet. This HTTP Response can be transmitted wirelessly and/or via fixed line from Router Two 2604 in a manner similar to that described in connection with FIG. 2M.

Referring now to FIG. 2Q, this is a diagram 2800 illustrating an example, non-limiting embodiment (Intranet Call Flow (HTTP)) that can function (fully or partially) within the communication network of FIG. 1 in accordance with various aspects described herein. In this FIG. 2Q, each of the Router One 2602, Router Two 2604, Web Services 2605, Public Cloud 2607, and User Database 2609 can correspond to the respective elements of FIG. 2M. In addition, this FIG. shows Internet 2708. For the purposes of this example, it is assumed that Router One 2602 and Router Two 2604 have already been registered (e.g., using the process shown in FIG. 2M).

Still referring to FIG. 2Q, both Router One 2602 and Router Two 2604 are in operative bi-directional communication with one another (e.g., via an Intranet). In this example, Router One 2602 transmits an HTTP Request (see the arrow 1 of this FIG.) to Router Two 2604. This HTTP Request can be transmitted wirelessly and/or via fixed line from Router One 2602 to Router Two 2604 in a manner similar to that described in connection with FIG. 2M.

Still referring to FIG. 2Q, Router Two 2604 transmits (e.g., in response to the HTTP Request from Router One 2602) an HTTP Response (see the arrow 2 of this FIG.) to Router One 2602. This HTTP Response can be transmitted wirelessly and/or via fixed line from Router Two 2604 to Router One 2602 in a manner similar to that described in connection with FIG. 2M.

In various examples, any desired programming languages/platforms can be utilized to implement features described herein (e.g., Tunneling, GRE encapsulation, DNS, LTE connection). In various examples, RestFull APIs can be used to interact with the Web app, and functionality for remote management can be implemented.

As described herein, various embodiments provide connectivity between two or more units of a business with a low-cost solution (e.g., without intervention from any technician or any user intervention).

As described herein, various embodiments provide a smart router. In one example, the smart router can be a 4G business smart router.

As described herein, various embodiments provide a wireless router with Wifi and two to four Lan ports with software that performs automatic tunnels between all the devices (e.g., other routers) that are provisioned as being associated with the same account (e.g., the same wireless carrier account) of a given client (e.g. a given subscriber).

As described herein, various embodiments can: (a) provide a solution that allows small businesses to share information between branches in a private network; (b) eliminate the need to establish a VPN (IPsec) between business branches; (c) eliminate the need to establish a VPN (IPsec) between end-devices; (d) provide plug-and-play hardware; (e) create a solution for non-technical users; (f) create a peer-to-peer full mesh between endpoints (e.g., routers) with the same user account; and/or (g) create a peer-to-peer full mesh between endpoints (e.g., routers) associated with the same user account.

As described herein, various embodiments can provide a gateway (e.g., an LTE gateway) that helps businesses (e.g., small and medium sized businesses) to each have their own respective private networks. In one example, mechanisms can be provided to enable each of the routers (e.g., each of the routers of a respective customer/subscriber/business) to create tunnel(s) among endpoints (building, for example, a full mesh). In another example, all of the endpoints of a particular mech are related to the same customer/subscriber account (e.g., subscriber account of a given subscriber to a wireless service of a wireless carrier).

As described herein, a smart router can utilize hardware and/or firmware and/or software to implement a modem (e.g., an LTE modem), a WiFi transceiver, or any combination thereof.

As described herein, various embodiments can provide smart routers with the following specifications: processor—Quad-core ARM Cortex A53 1.2 GHz; Flash—8 GB; RAM—1 GB; AES Throughput—N/A; WAN Ethernet—N/A; LAN Ethernet—2×10/100 MB; POE 802.3af LAN ports—N/A; WLAN—802.11 a/b/g/n 2.4 GHz; External USB ports—N/A; Serial Port—N/A; Internal LTE Modem—1× Plug-In LTE Modem; SIMS—1; Power Switch—1; Enclosure—Injection in ABS.

As described herein, various embodiments can provide smart routers which require no local web interface (wherein, for example, all initial settings for each router are configured by default).

As described herein, various embodiments can provide smart routers with zero-touch provisioning (wherein, for example, each router can be provisioned and configured automatically). In one specific example, such automatic functionality can eliminate the manual and technical labor that is conventionally required in creating tunnels between routers.

As described herein, in various embodiments each smart router (at each location) can connect to the carrier server(s). The carrier server(s) can have access to the accounts of the various customers. The carrier server(s) can consult, for a given customer (e.g., a given business or a given organization), which remote devices that customer has on its account and based on this information the carrier server(s) can automatically create (and/or automatically facilitate creation of) tunnels (e.g., GRE tunnels) between two or more (e.g., all) of the remote devices (e.g., routers) of that given customer. For example, if the customer wants to add a new location, the customer will just obtain (e.g., buy or lease) another smart router and ask for the new smart router to be provisioned into the account of the customer. The carrier server(s) (along with the new smart router and any other previously provisioned smart routers) can set up the tunnels automatically. In one example, these tunnels are created on the same APN (Access Point Name). In another example, the information that the customer shares among the devices at the various locations never leaves the carrier network (e.g., the core network).

As described herein, various embodiments can operate in the context of fixed internet devices (e.g., in the context of fixed carrier lines and/or cable content providers). Such fixed internet devices could, for example, perform the tunnels and create VPN access for respective customers/subscribers using various mechanisms described herein.

As described herein, various embodiments can provide a low-cost solution that helps people to connect their business locations (e.g., without having to utilize a technician or someone specialized in IT). In one specific example, various mechanisms described herein can be utilized in emerging markets.

As described herein, various embodiments can provide mechanisms via which a given wireless services subscriber can have its various locations (e.g., retail stores) connected with the same Internet service and without intervention of any technician. In one example, various mechanisms described herein can be built over the top of the network parameters and the billing system. In another example, various mechanisms described herein that are built over the top of the network parameters and the billing system can be implemented with no (or little) integration with the systems of the carrier.

As described herein, various embodiments can alternatively (or additionally) implement another (e.g., an extra) layer of security (such as IP security) for the tunnels (e.g., the tunnels can have IPSEC).

As described herein, various embodiments can alternatively (or additionally) work on fixed line (e.g., various embodiments can work on fixed line without LTE or other wireless connection).

As described herein, various embodiments can alternatively (or additionally) use a respective MAC address for the registering and/or updating of the routers (e.g., a smart router can register itself on the system (and/or perform updates) by using the MAC address of the smart router, instead of the IMEI, MSISDN and WAN of the smart router).

As described herein, various embodiments can store subscriber information, router information and/or user information in one or more profiles (e.g., each user can have a respective profile with user information such as username and password).

As described herein, various embodiments can provide for communication of information (e.g., configuration information, provisioning information and/or traffic (such as secure traffic carried over one or more secure tunnels)). The information can be transmitted and/or received via a fixed line (or wired) communication path, a wireless communication path, or any combination thereof.

Figure 3:
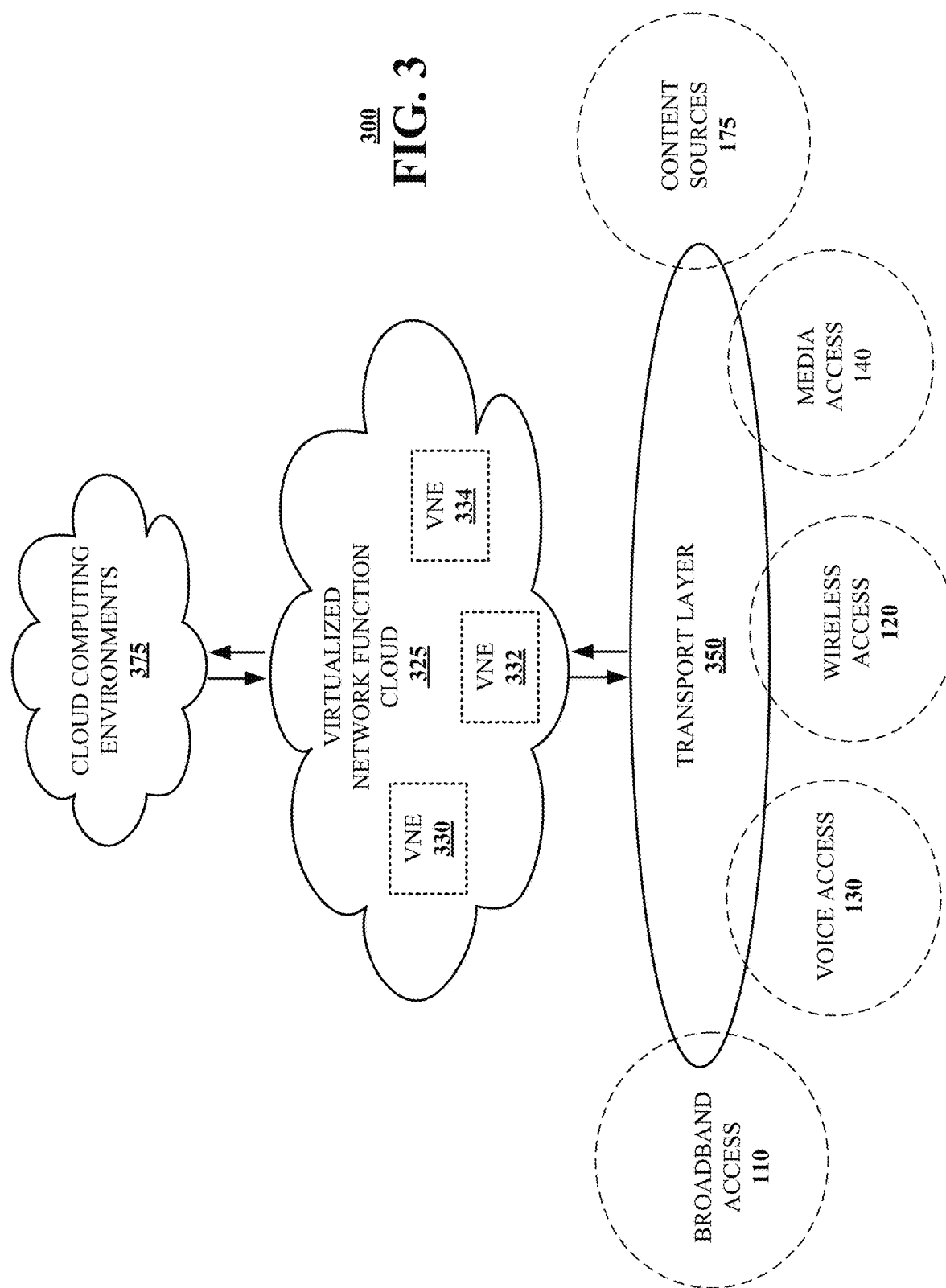
FIG. 3 is a block diagram illustrating an example, non-limiting embodiment of a virtualized communication network in accordance with various aspects described herein.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of communication network 100, systems 2000, 2050, flows 2100, 2150, 2200, 2250, 2300, and/or methods 2350, 2400, 2450, presented in FIGS. 1 and 2A-2L. For example, virtualized communication network 300 can facilitate in whole or in part provisioning/configuring of one or more routers (e.g., initially and/or periodically) and enabling secure communications between two or more routers (e.g., routers that have previously been provisioned/configured).

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
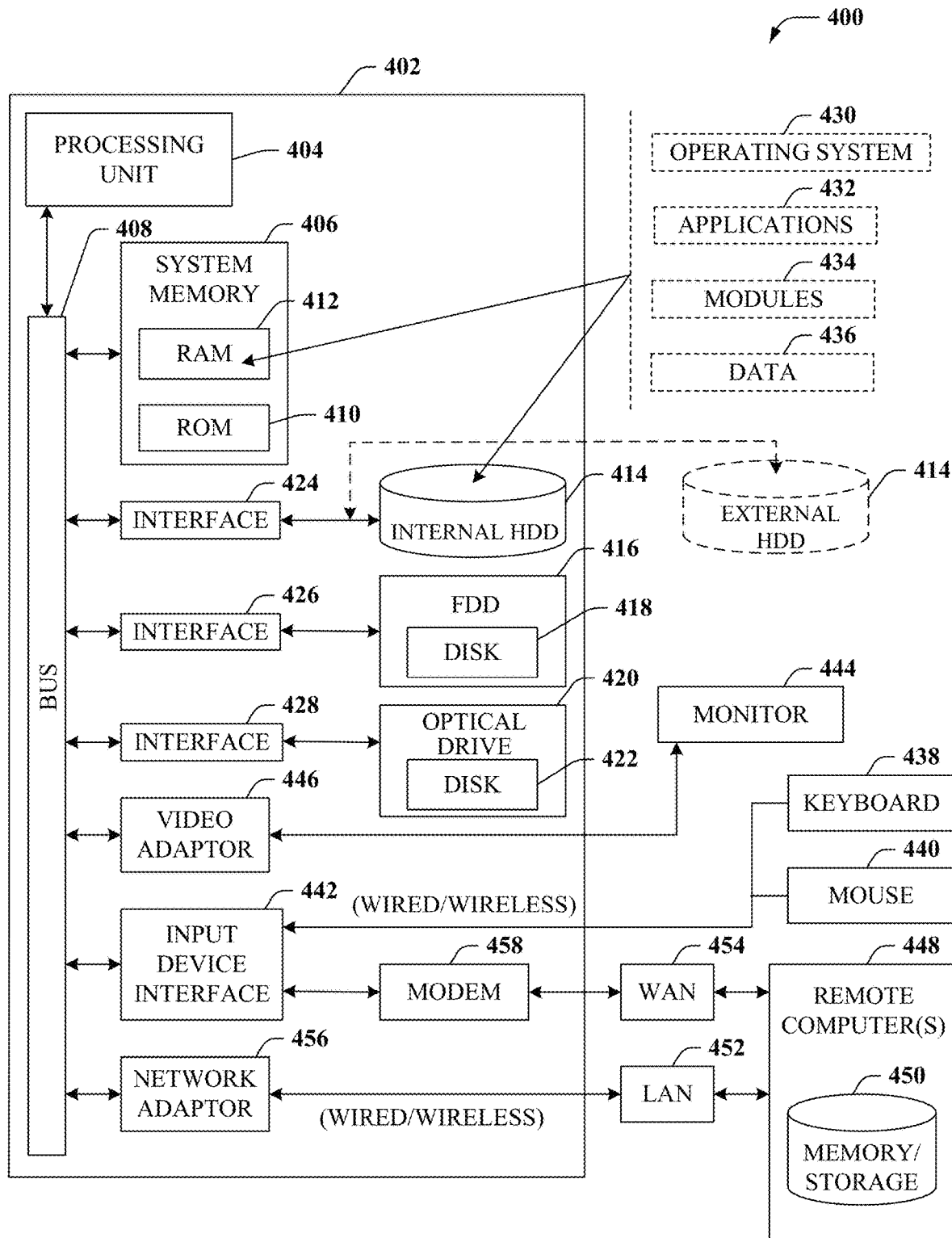
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part provisioning/configuring of one or more routers (e.g., initially and/or periodically) and enabling secure communications between two or more routers (e.g., routers that have previously been provisioned/configured).

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
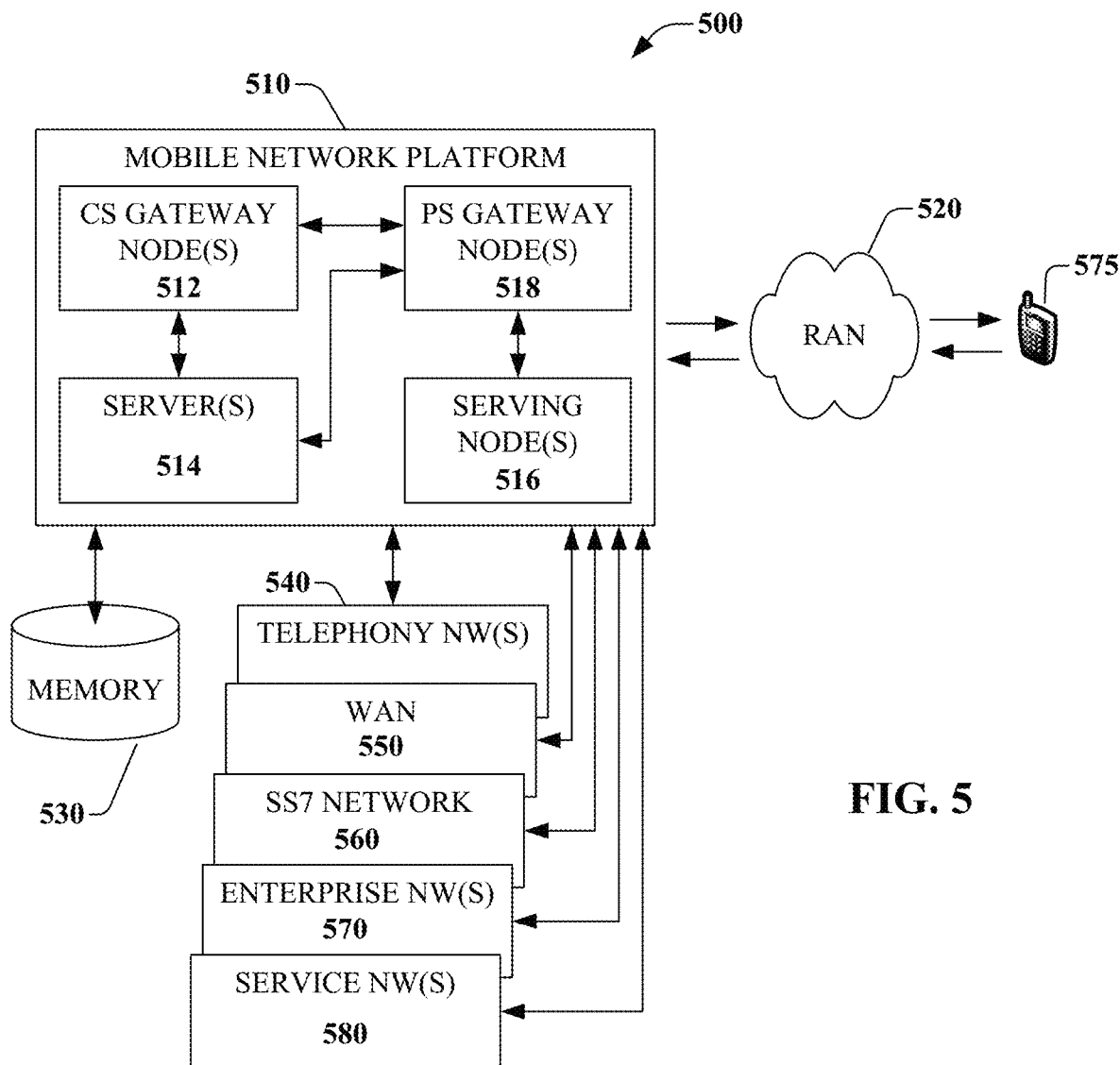
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part provisioning/configuring of one or more routers (e.g., initially and/or periodically) and enabling secure communications between two or more routers (e.g., routers that have previously been provisioned/configured). In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(*s*) that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It is should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
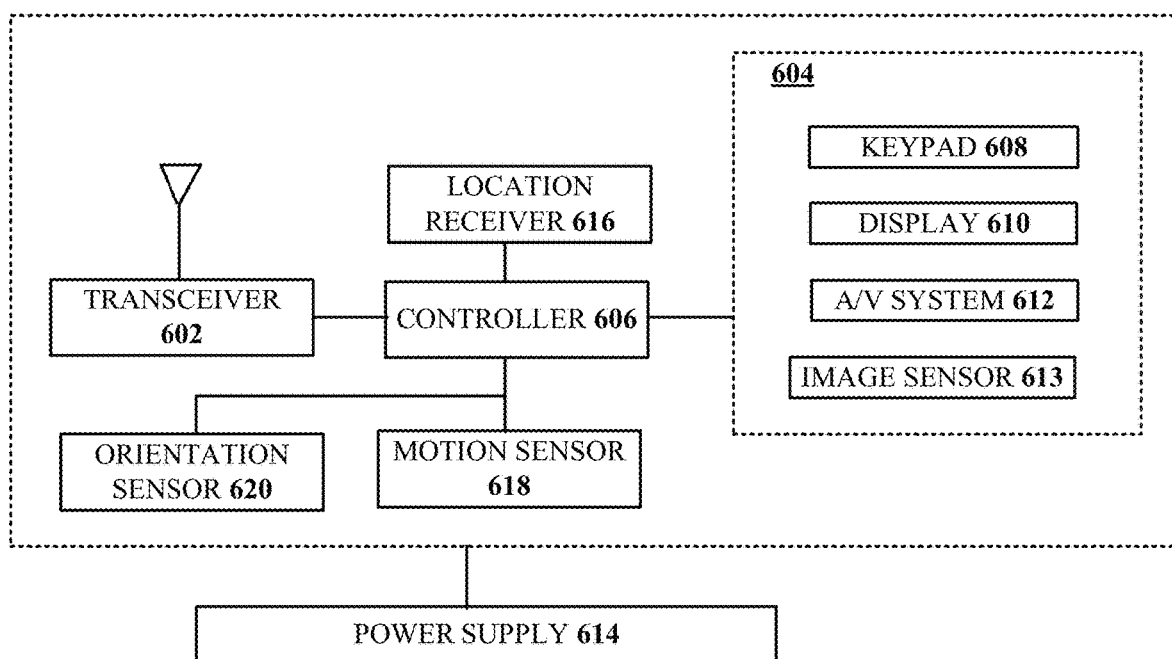
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part provisioning/configuring of one or more routers (e.g., initially and/or periodically) and enabling secure communications between two or more routers (e.g., routers that have previously been provisioned/configured).

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically provisioning/configuring of one or more routers (e.g., initially and/or periodically) and enabling secure communications between two or more routers (e.g., routers that have previously been provisioned/configured)) can employ various AI-based schemes for carrying out various embodiments thereof. Moreover, the classifier can be employed to determine a ranking or priority of each router. A classifier is a function that maps an input attribute vector, $x=(x1, x2, x3, x4, \ldots, xn)$, to a confidence that the input belongs to a class, that is, $f(x)=confidence$ (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/ communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
a processing system including a processor; and
a memory that stores executable instructions that, when executed by the processing system, facilitate performance of operations, the operations comprising:
wirelessly receiving from a second router of a first subscriber of a wireless carrier, via a wireless service of the wireless carrier, a first registration request made by the second router, a first router of the first subscriber being located at a first physical location, and the second router being located at a second physical location; and
wirelessly sending to the second router, via the wireless service of the wireless carrier, first provisioning information, the first provisioning information being based at least in part upon first configuration data for the first router that is stored in a database, the first provisioning information enabling the first router and the second router to communicate with one another via the wireless service through a first tunnel mechanism.

2. The device of claim 1, wherein the first tunnel mechanism provides secure end-to-end communication between the first router and the second router via the wireless service.

3. The device of claim 1, wherein:
the operations further comprise, responsive to receipt of the first registration request, generating the first provisioning information;
responsive to receipt of the first registration request, the first subscriber is identified;
responsive to identification of the first subscriber, first subscriber information is selected from among all subscriber information that is stored in the database; and
the first provisioning information is generated based at least in part upon the first subscriber information that is selected.

4. The device of claim 1, wherein the first provisioning information comprises network address data for the first router.

5. The device of claim 1, wherein the operations further comprise enabling the first tunnel mechanism between the first router and the second router.

6. The device of claim 5, wherein the first tunnel mechanism comprises a generic routing encapsulation (GRE) tunnel.

7. The device of claim 5, wherein the first provisioning information is based at least in part upon first subscriber information that is stored in the database.

8. The device of claim 1, wherein the operations further comprise:
storing, in the database, the first configuration data for the first router;
storing, in the database, second configuration data for the second router, the second configuration data being stored in association with first subscriber information;
wirelessly receiving from a third router of the first subscriber, via the wireless service of the wireless carrier, a second registration request made by the third router, the third router being located at a third physical location;
responsive to receiving the second registration request, generating second provisioning information, the second provisioning information being based at least in part upon first subscriber information that is stored in the database and being based at least in part upon the second configuration data for the second router that is stored in the database; and
wirelessly sending to the third router, via the wireless service of the wireless carrier, the second provisioning information, the second provisioning information enabling the second router and the third router to communicate with one another via the wireless service through a second tunnel mechanism.

9. The device of claim 8, wherein the second provisioning information further enables the third router and the first router to communicate with one another via the wireless service through a third tunnel mechanism.

10. The device of claim 9, wherein the operations further comprise enabling the second tunnel mechanism between the second router and the third router and enabling the third tunnel mechanism between the third router and the first router.

11. The device of claim 1, wherein:
the first subscriber is a business entity;
the business entity carries out first operations at the first physical location;
the business entity carries out second operations at the second physical location; and
the first physical location is remote from the second physical location.

12. The device of claim 1, wherein:
the first physical location is in a first building;
the second physical location is in a second building; and
the first building is a different building than the second building.

13. The device of claim 1, wherein the first configuration data is part of first subscriber information associated with the first subscriber, wherein second subscriber information is associated with a second subscriber of the wireless carrier, the second subscriber information comprising second configuration data for a third router of the second subscriber, the third router being located at a third location, and wherein the operations further comprise:
wirelessly receiving from a fourth router of the second subscriber, via the wireless service of the wireless carrier, a second registration request made by the fourth router, the fourth router being at a fourth physical location;
responsive to receiving the second registration request, generating second provisioning information, the second provisioning information being based at least in part upon the second subscriber information that is stored in the database and being based at least in part upon the second configuration data for the third router that is stored in the database; and
wirelessly sending to the fourth router, via the wireless service of the wireless carrier, the second provisioning information, the second provisioning information enabling the third router and the fourth router to communicate with one another via the wireless service through a second tunnel mechanism.

14. The device of claim 1, wherein the wirelessly receiving and the wirelessly sending are performed automatically, without user interaction.

15. A non-transitory machine-readable medium comprising executable instructions that, when executed by a processing system including a processor, facilitate performance of operations, the operations comprising:
- storing, in a database, first identification data of a first router of a subscriber, the subscriber being subscribed to a wireless service of a wireless carrier, the first router operating at a first physical location, a first message being wirelessly received from the first router, the first message comprising the first identification data of the first router, the first identification data of the first router being stored in association with subscriber information of the subscriber to the wireless service;
- storing, in the database, second identification data of a second router of the subscriber, the second router operating at a second physical location that is different from the first physical location, a second message being wirelessly received from the second router, the second message comprising second identification data of the second router, the second identification data of the second router being stored in association with subscriber information of the subscriber to the wireless service; and
- enabling a forming of a tunnel mechanism between the first router and the second router, the tunnel mechanism being formed between the first router and the second router via the wireless service, the tunnel mechanism being formed responsive to a determination that the first identification data of the first router and the second identification data of the second router are both stored in the database in association with the subscriber to the wireless service.

16. The non-transitory machine-readable medium of claim 15, wherein:
- the first identification data comprises a first International Mobile Equipment Identity (IMEI), a first Mobile Station International Subscriber Directory Number (MSISDN), or any combination thereof;
- the second identification data comprises a second IMEI, a second MSISDN, or any combination thereof;
- the processing system comprises one or more servers of the wireless carrier;
- communication by the first router via the tunnel mechanism is exclusively wireless between the first router and the one or more servers of the wireless carrier; and
- communication by the second router via the tunnel mechanism is exclusively wireless between the second router and the one or more servers of the wireless carrier.

17. The non-transitory machine-readable medium of claim 15, wherein:
- the first identification data comprises a first Media Access Control (MAC) address, a first Wide Area Network (WAN) IP Address, or any combination thereof; and
- the second identification data comprises a second MAC address, a second WAN IP address, or any combination thereof.

18. A method, comprising:
- wirelessly transmitting by a first router having a processing system including a processor, exclusively via a wireless service of a wireless carrier, a registration request to a network element of the wireless carrier that provides the wireless service, the first router operating at a first physical location of a subscriber to the wireless service; and
- wirelessly receiving by the first router, exclusively via the wireless service of the wireless carrier, provisioning information, the provisioning information comprising configuration data from a database of the wireless carrier, the configuration data being obtained from the database based upon the first router being associated in the database with a second router of the subscriber to the wireless service, the second router operating at a second physical location that is different from the first physical location, the configuration data identifying a network location of the second router, the provisioning information enabling the first router and the second router to communicate with one another via the wireless service through a tunnel mechanism that extends between the first router and the second router exclusively over the wireless service.

19. The method of claim 18, wherein the configuration data identifying the network location of the second router comprises an IP address.

20. The method of claim 18, wherein the wireless service comprises an LTE (Long-term Evolution) wireless protocol, a $5^{th}$ generation wireless protocol, a $6^{th}$ generation wireless protocol, or any combination thereof.

* * * * *